(12) United States Patent
Funatsu

(10) Patent No.: US 10,630,904 B2
(45) Date of Patent: Apr. 21, 2020

(54) ELECTRONIC DEVICE, CONTROL METHOD FOR CONTROLLING THE SAME, AND STORAGE MEDIUM FOR CHANGING A DISPLAY POSITION

(71) Applicant: CANON KABUSHIKI KAISHA, Tokyo (JP)

(72) Inventor: Yoshihiro Funatsu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/215,374

(22) Filed: Dec. 10, 2018

(65) Prior Publication Data

US 2019/0199934 A1 Jun. 27, 2019

(30) Foreign Application Priority Data

Dec. 22, 2017 (JP) ................. 2017-246877

(51) Int. Cl.
*H04N 5/232* (2006.01)
*H04N 5/225* (2006.01)

(52) U.S. Cl.
CPC ... *H04N 5/232935* (2018.08); *H04N 5/22525* (2018.08); *H04N 5/23245* (2013.01)

(58) Field of Classification Search
CPC ......... H04N 5/232935; H04N 5/22525; H04N 5/23245; H04N 5/232939; H04N 5/232933; H04N 5/23216
See application file for complete search history.

(56) References Cited

U.S. PATENT DOCUMENTS

| | | | |
|---|---|---|---|
| 2016/0224225 A1* | 8/2016 | Kondo | H04N 5/23293 |
| 2017/0064194 A1* | 3/2017 | Miyajima | G06F 3/04845 |
| 2017/0264818 A1* | 9/2017 | Liao | G06F 3/04817 |
| 2017/0332008 A1* | 11/2017 | Tsuchiya | G03B 15/00 |

FOREIGN PATENT DOCUMENTS

| | | |
|---|---|---|
| JP | 2014-127089 A | 7/2014 |
| JP | 2017-041805 A | 2/2017 |

* cited by examiner

*Primary Examiner* — Nicholas G Giles
(74) *Attorney, Agent, or Firm* — Canon USA, Inc., IP Division

(57) ABSTRACT

An electronic device includes a display control unit configured to perform control to display a first display item and a predetermined item on the display screen, and a control unit configured to perform control in such a manner that, according to an operation on the display screen in a first state, the first state transitions to a second state for changing a display position of the first display item, wherein, in a case where the first state transitions to the second state, the predetermined item is displayed regardless of the display position of the first display item, and in a case where an operation for changing the display position of the first display item is performed in the second state, the predetermined item is displayed at a position corresponding to the changed display position of the first display item.

17 Claims, 13 Drawing Sheets

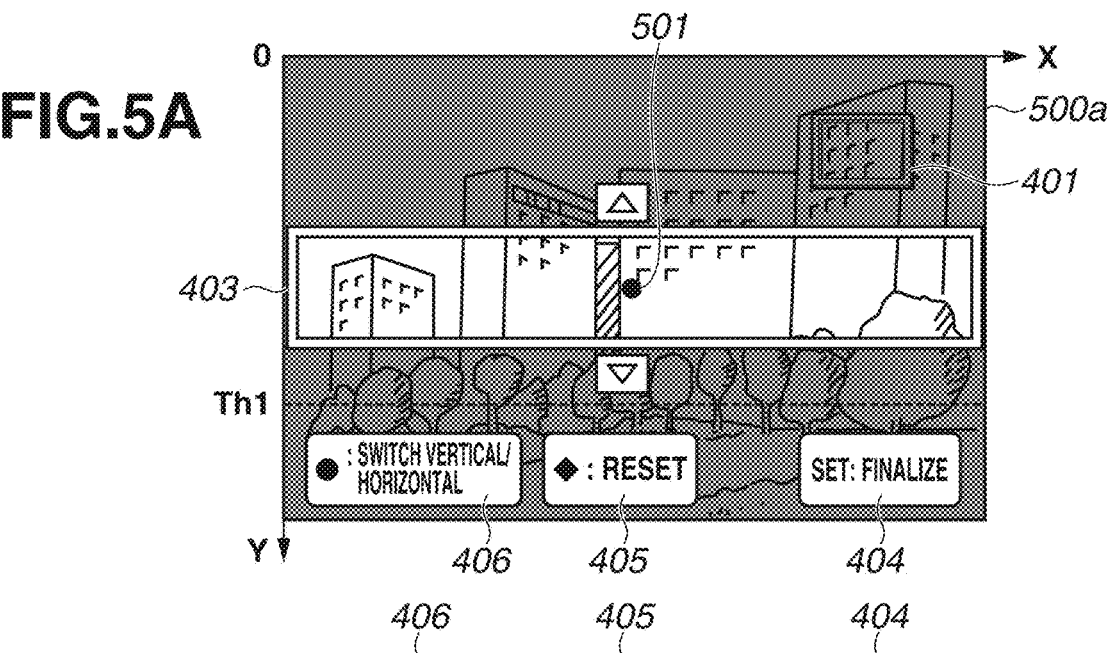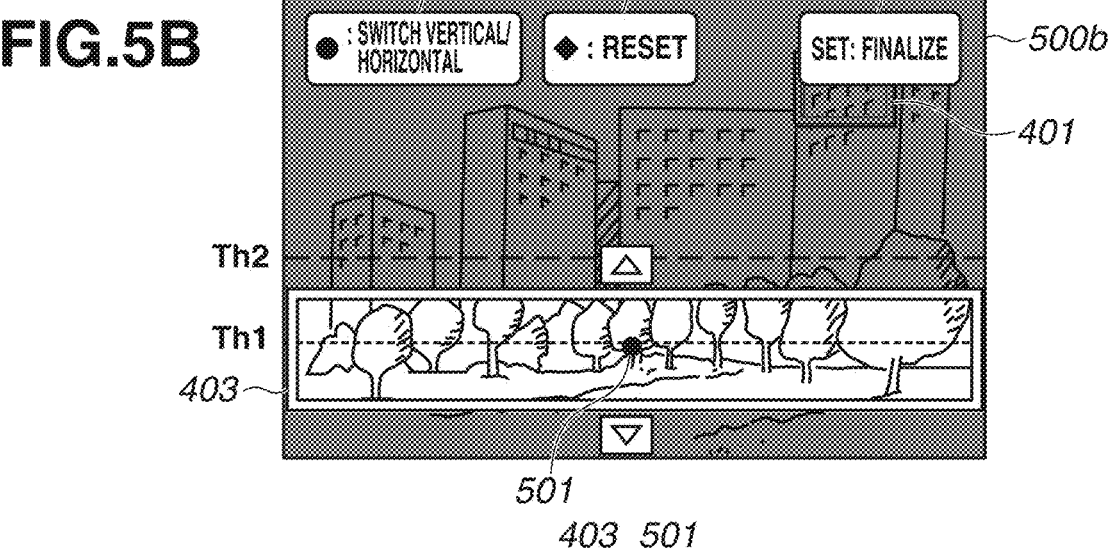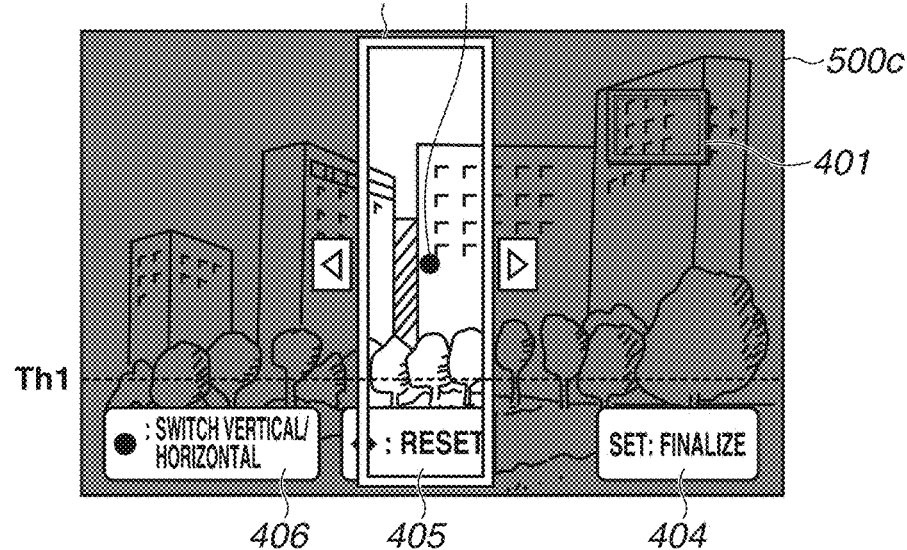

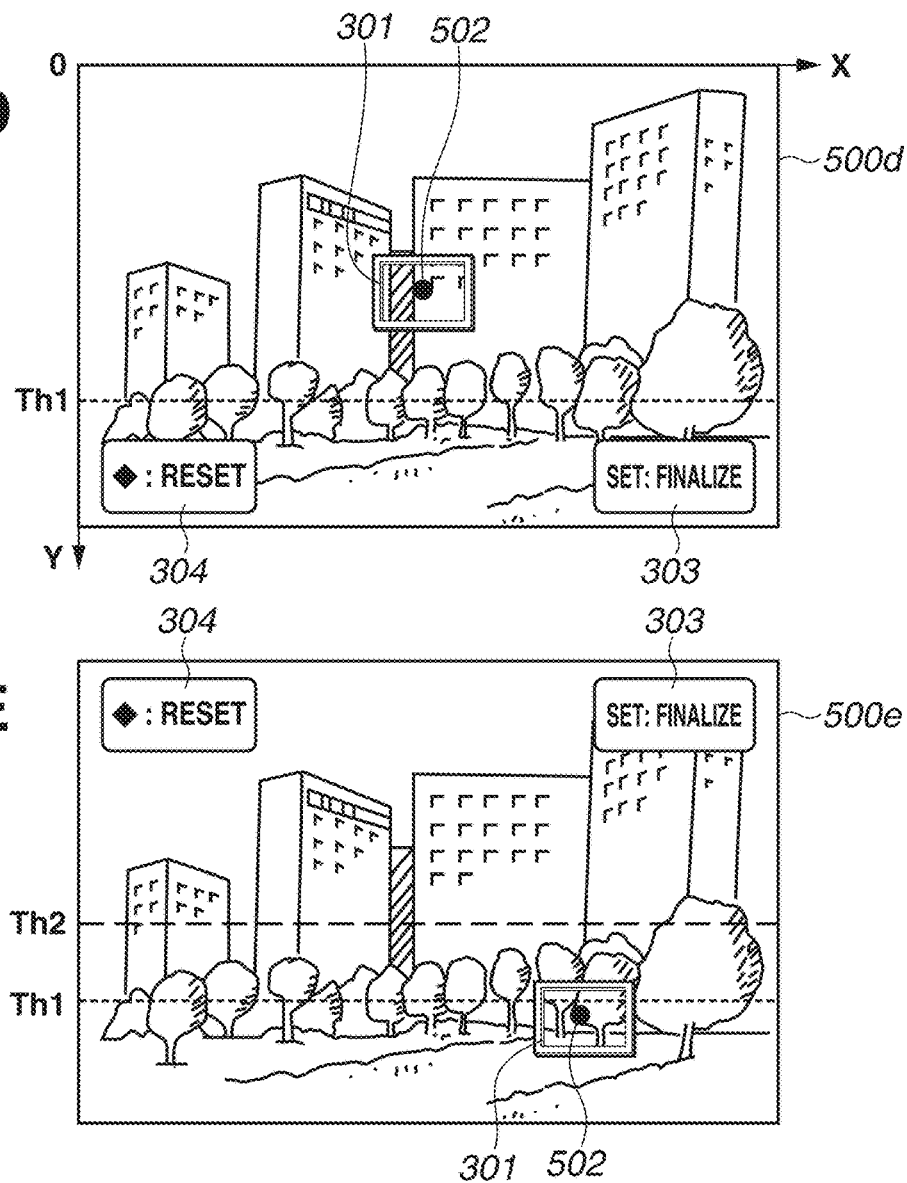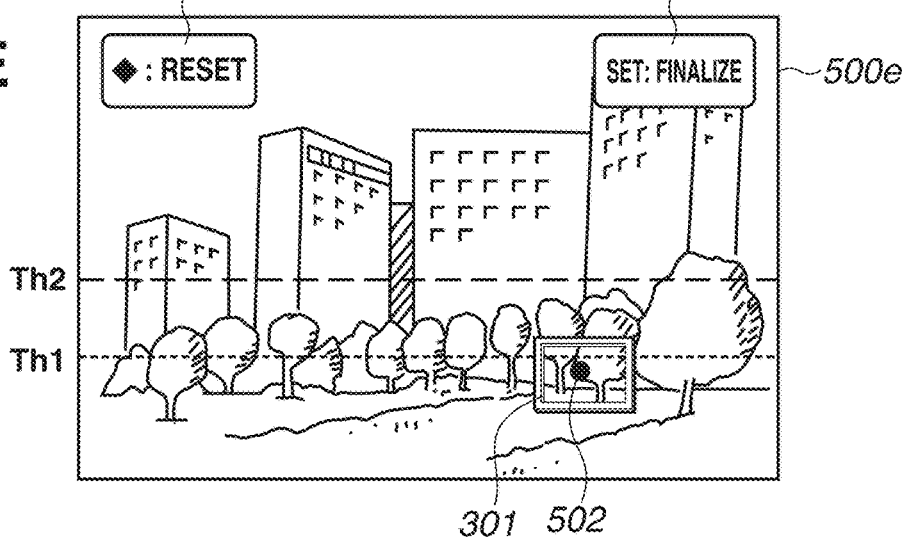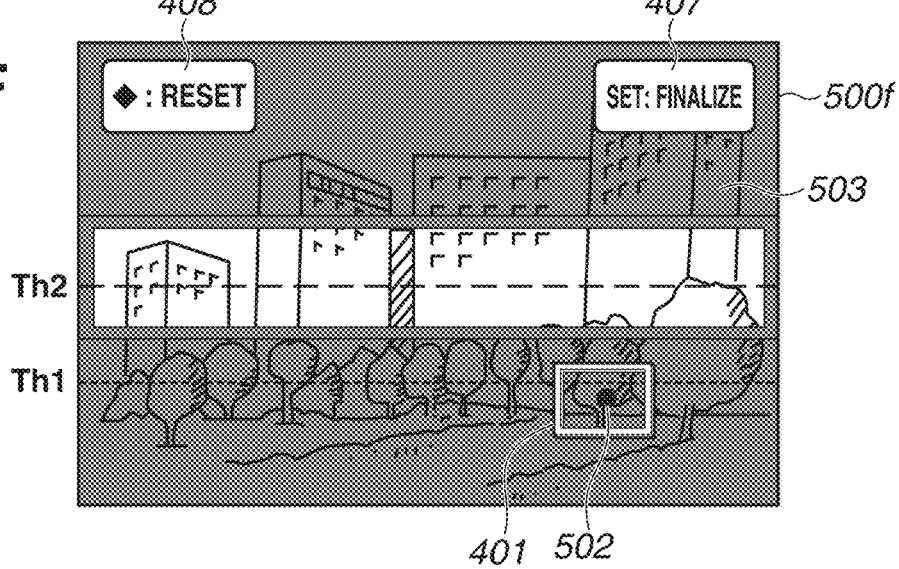

ELECTRONIC DEVICE, CONTROL METHOD FOR CONTROLLING THE SAME, AND STORAGE MEDIUM FOR CHANGING A DISPLAY POSITION

BACKGROUND

Field of the Disclosure

The present disclosure generally relates to an electronic device that controls the display of an item, a control method for controlling the electronic device, and a storage medium.

Description of the Related Art

An apparatus for displaying an item at a position indicated by a user, such as a touched position, is discussed. Japanese Patent Application Laid-Open No. 2014-127089 discusses an electronic device for displaying, on an image capturing screen, touchable buttons along the right and left sides of the screen together with a live image and further allowing the indication of the position of an autofocus (AF) frame by a touch on the live image.

Further, an apparatus for preventing positions where a user provides an input, such as an area where a touch operation is received and a touch button, from overlapping each other is discussed. Japanese Patent Application Laid-Open No. 2017-41805 discusses a method for moving a setting area according to a touch operation, and after a setting is made, displaying an icon for receiving an image capturing instruction outside the moved setting area.

In the electronic device discussed in Japanese Patent Application Laid-Open No. 2014-127089, an area where the position of the AF frame is received and an area where the buttons are displayed are determined in advance. In a case where a user wants to indicate the position of the AF frame in the area where the buttons are displayed, the user cannot indicate the position of the AF frame. In the method discussed in Japanese Patent Application Laid-Open No. 2017-41805, the display position of the icon changes according to the position of the setting area. Thus, in a case where a user performs a touch operation without noticing a change in the display position of the icon, an unintended process may be performed. As described above, in a case where an instruction is given to an item by the operation of inputting a position, the operability for the user may decrease depending on the position where the item is displayed.

SUMMARY

The present disclosure is directed to improving the operability when an input instruction is given to an item by the operation of inputting a position.

According to one or more aspects of the present disclosure, an electronic device includes a detection unit configured to detect an operation on a display screen, a display control unit configured to perform control to display a first display item and a predetermined item on the display screen, and a control unit configured to perform control in such a manner that, according to an operation on the display screen in a first state, the first state transitions to a second state for changing a display position of the first display item, wherein the display control unit performs control in such a manner that, in a case where the first state transitions to the second state, the predetermined item is displayed, regardless of the display position of the first display item, and in a case where an operation for changing the display position of the first display item is performed in the second state, the predetermined item is displayed at a position corresponding to the changed display position of the first display item.

Further features of the present disclosure will become apparent from the following description of exemplary embodiments with reference to the attached drawings.

BRIEF DESCRIPTION OF THE DRAWINGS

FIGS. 5A, 5B, 5C, 5D, 5E, and 5F are diagrams illustrating positions of touch buttons.

DESCRIPTION OF THE EMBODIMENTS

Various exemplary embodiments, features, and aspects of the present disclosure will be described below with reference to the drawings.

In a first exemplary embodiment, a case is described where an electronic device is a digital camera 100 (hereinafter referred to as a "camera 100").

Figure 1A:
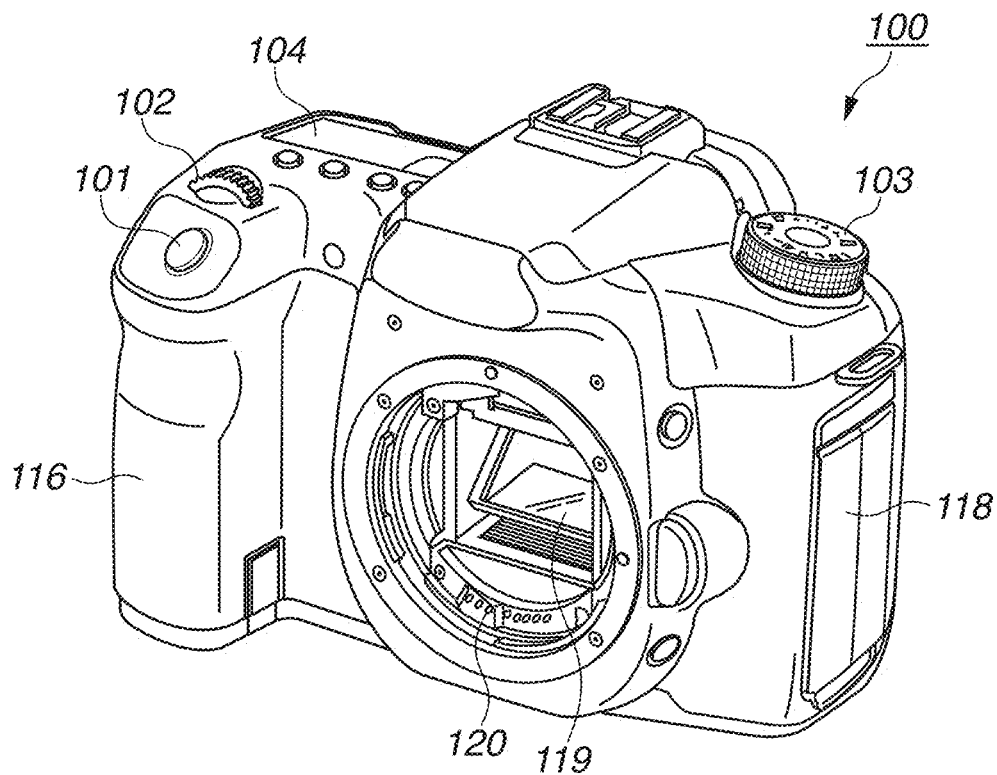
FIGS. 1A and 1B are diagrams illustrating examples of external views of a camera according to a first exemplary embodiment.
Figure 1B:
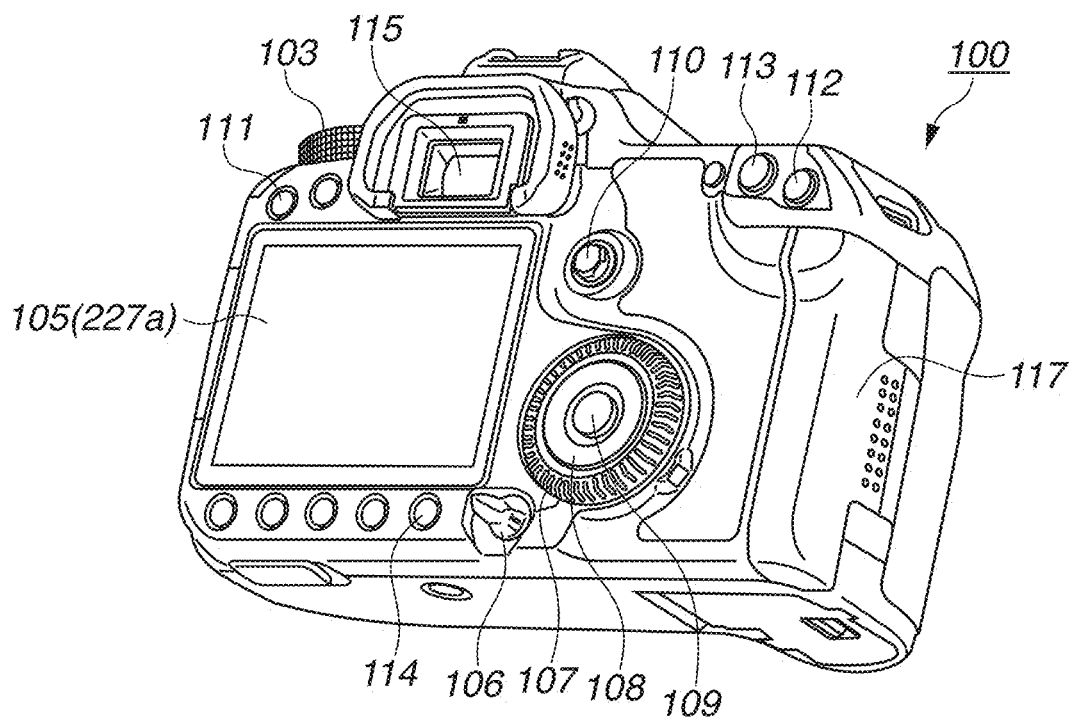

FIGS. 1A and 1B are diagrams illustrating examples of external views of the camera 100. FIG. 1A is a front perspective view of the camera 100, and FIG. 1B is a rear perspective view of the camera 100.

The camera 100 includes on its upper surface a shutter button 101, a main electronic dial 102, a mode selection switch 103, and an outside-viewfinder display unit 104. The shutter button 101 is an operation unit for giving an image capturing preparation instruction or an image capturing instruction. The main electronic dial 102 is a rotary operation unit for changing a setting value for the shutter speed, the stop, and the like. The mode selection switch 103 is an operation unit for switching various modes. The mode selection switch 103 allows switching to a still image capturing mode and a moving image capturing mode. The outside-viewfinder display unit 104 displays various setting values for the shutter speed, the stop, and the like.

Further, the camera 100 includes on its back surface a display unit 105, a power switch 106, a sub electronic dial 107, a directional pad 108, a SET button 109, and a multi-controller 110. Further, the camera 100 includes a live view button 111, an enlargement button 112, a reduction button 113, a reproduction button 114, and a viewfinder 115.

The display unit 105 displays an image and various pieces of information. The display unit 105 is an example of a display unit. Further, the display unit 105 displays a live view image, a quick review image after a still image is captured, or an image while a moving image is being recorded. In the present exemplary embodiment, the shape of the display unit 105 is a rectangle long in the horizontal direction. The power switch 106 is an operation unit for switching the turning on and off of the camera 100. The sub electronic dial 107 is a rotary operation unit for moving a selection frame or advancing an image. The directional pad 108 is a key of which upper, lower, left, and right portions can be pressed (a four-direction key), and allows an operation according to a pressed position. The SET button 109 is an operation unit to be pressed mainly to determine a selection item. The multi-controller 110 allows a key operation in eight directions, namely up, down, left, right, upper right, lower right, upper left, and lower left directions.

The live view button 111 is an operation unit for switching between a finder image capturing mode and a live view image capturing mode in the still image capturing mode and giving instructions to start and stop the capturing (recording) of a moving image in the moving image capturing mode. The enlargement button 112 is an operation unit for turning on and off an enlargement mode in the display of a live view image or changing the enlargement ratio in the enlargement mode. Further, the enlargement button 112 is used to increase the enlargement ratio of a reproduction image in a reproduction mode. The reduction button 113 is an operation unit for decreasing the enlargement ratio of an enlarged reproduction image, thereby reducing the displayed image. The reproduction button 114 is a button for switching between an image capturing mode and the reproduction mode. The reproduction button 114 is pressed during the still image capturing mode or the moving image capturing mode, whereby the mode is switched to the reproduction mode, and the latest image among images recorded in a storage medium is displayed on the display unit 105. The viewfinder 115 is a look-in type viewfinder for observing a focusing screen to confirm the focus and the composition of an optical image of an object.

Further, the camera 100 includes a grip portion 116 and a cover portion 117 on the right side thereof and includes a terminal cover 118 on the left side thereof. The grip portion 116 is a holding portion formed for easy gripping with the right hand when a user holds the camera 100. The cover portion 117 is a cover for closing a slot for storing a storage medium. The terminal cover 118 is a cover for protecting a connector to which a connection cable of an external device is connected.

Further, within the camera 100, a quick-return mirror 119 is placed, which is moved up and down by an actuator. Further, the camera 100 includes a communication terminal 120 for communicating with an attachable and detachable lens unit.

Figure 2:
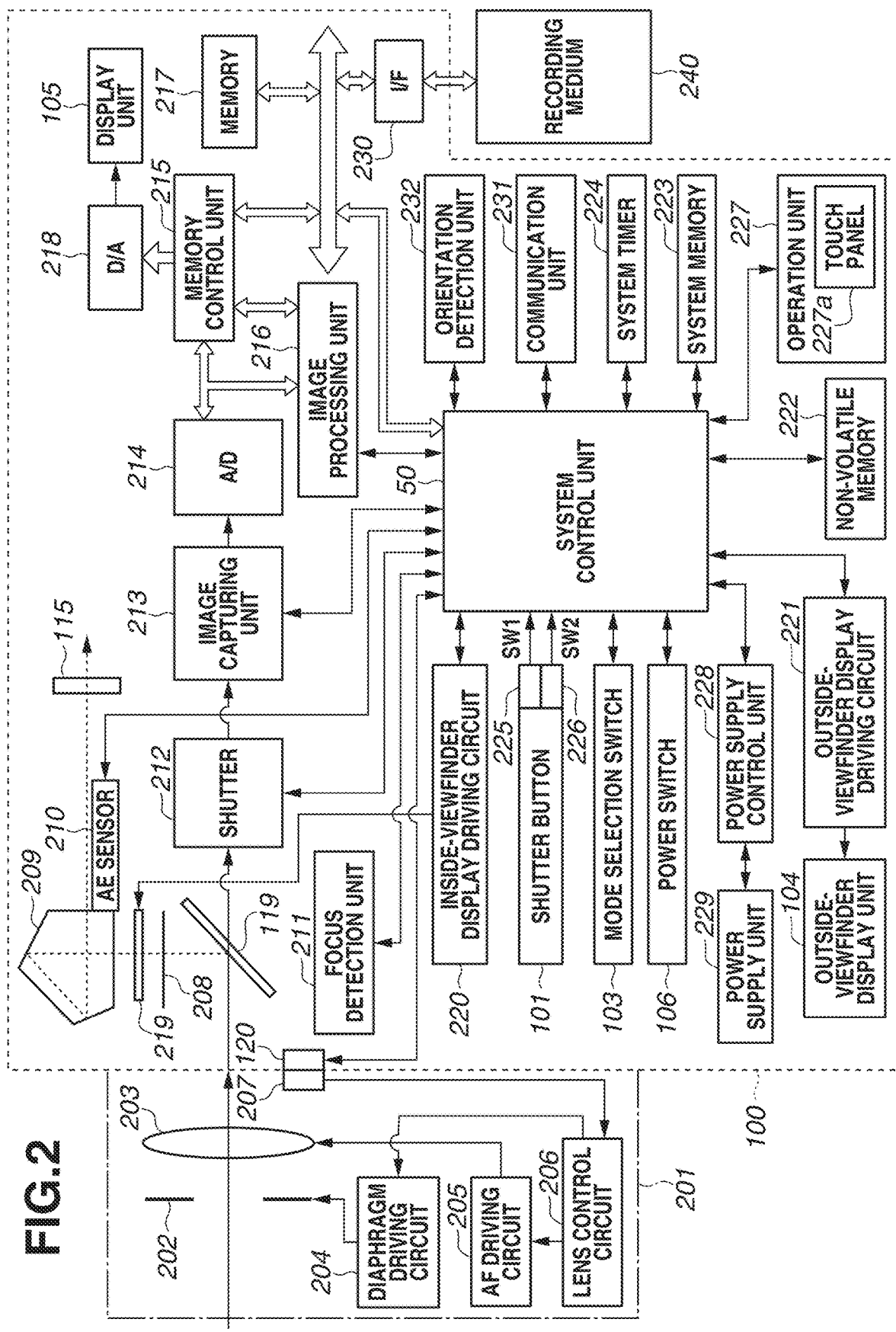
FIG. 2 is a block diagram illustrating an example of a configuration of the camera.

FIG. 2 is a block diagram illustrating an example of the configuration of the camera 100. The same components as those in FIG. 1 are designated by the same signs, and the description of these components is appropriately omitted. To the camera 100, an attachable and detachable lens unit 201 is attached.

The lens unit 201 includes a diaphragm 202, a lens group 203, a diaphragm driving circuit 204, an autofocus (AF) driving circuit 205, a lens control circuit 206, and a communication terminal 207. The diaphragm 202 is configured so that the aperture diameter of the diaphragm 202 can be adjusted. The lens group 203 includes a plurality of lenses. The diaphragm driving circuit 204 controls the aperture diameter of the diaphragm 202, thereby adjusting the amount of light. The AF driving circuit 205 drives the lens group 203, thereby coming into focus. Based on an instruction from a system control unit 50, the lens control circuit 206 controls the diaphragm driving circuit 204 or the AF driving circuit 205. The lens control circuit 206 controls the diaphragm 202 via the diaphragm driving circuit 204 and displaces the position of the lens group 203 via the AF driving circuit 205, thereby coming into focus. The lens control circuit 206 can communicate with the camera 100. More specifically, the lens control circuit 206 communicates with the camera 100 via the communication terminal 207 of the lens unit 201 and the communication terminal 120 of the camera 100.

The camera 100 will now be described.

The camera 100 includes the quick-return mirror 119, a focusing screen 208, a pentaprism 209, an automatic exposure (AE) sensor 210, a focus detection unit 211, the viewfinder 115, a shutter 212, an image capturing unit 213, and the system control unit 50.

The quick-return mirror 119 (hereinafter, the "mirror 119") is moved up and down by an actuator (not illustrated) according to an instruction from the system control unit 50 in a case where exposure is performed, a live view image is displayed, or a moving image is captured. The mirror 119 switches a path of a light beam incident from the lens group 203 to the viewfinder 115 side or the image capturing unit 213 side. In a normal case, the mirror 119 is placed to guide the light beam to the viewfinder 115 side. In a case where an image is captured, or in a case where a live view image is displayed, the mirror 119 flips up and retracts from the light beam to guide the light beam to the image capturing unit 213 (mirror-up). Further, the mirror 119 is formed by a one-way mirror a center portion of which transmits a part of light. The mirror 119 allows a part of the light beam to become incident on the focus detection unit 211 for detecting a focus.

The AE sensor 210 measures the luminance of an object through the lens unit 201.

Based on the light beam transmitted through the mirror 119, the focus detection unit 211 detects the amount of defocus. Based on the amount of defocus, the system control unit 50 controls the lens unit 201, thereby performing phase difference AF. The user observes the focusing screen 208 through the pentaprism 209 and the viewfinder 115 and thereby can confirm the focus and the composition of an optical image of the object obtained through the lens unit 201. The shutter 212 is a focal-plane shutter capable of freely controlling the exposure time of the image capturing unit 213 based on an instruction from the system control unit 50. The image capturing unit 213 is an image sensor formed by a charge-coupled device (CCD) or a complementary metal-oxide-semiconductor (CMOS) device, which converts an optical image into an electric signal.

Further, the camera 100 includes an analog-to-digital (A/D) converter 214, a memory control unit 215, an image processing unit 216, a memory 217, a digital-to-analog (D/A) converter 218, and the display unit 105. The A/D converter 214 converts an analog signal output from the image capturing unit 213 into a digital signal. The image processing unit 216 performs a resizing process, such as predetermined pixel interpolation and reduction, and a color conversion process on image data from the A/D converter 214 or image data from the memory control unit 215. Further, the image processing unit 216 performs a predetermined calculation process using captured image data. Then, the system control unit 50 performs exposure control and distance measurement control based on the obtained calculation result. By this process, an AF process, an AE process, and a pre-flash (EF) process are performed by a through-the-lens (TTL) method. Further, the image processing unit 216 also performs a predetermined calculation process using captured image data and performs an auto white balance (AWB) process by the TTL method based on the obtained calculation result.

Image data from the A/D converter 214 is written to the memory 217 via the image processing unit 216 and the memory control unit 215 or directly via the memory control unit 215. The memory 217 stores image data obtained by the image capturing unit 213 and converted into digital data by the A/D converter 214 and image data to be displayed on the display unit 105. The memory 217 has a sufficient storage capacity for storing a predetermined number of still images and a moving image and a sound of a predetermined length of time. Further, the memory 217 also serves as a memory for image display (a video memory).

The D/A converter 218 converts image data for display stored in the memory 217 into an analog signal and supplies the analog signal to the display unit 105. Thus, image data for display written in the memory 217 is displayed on the display unit 105 via the D/A converter 218. The display unit 105 performs display on a display device such as a liquid crystal display (LCD) according to an analog signal from the D/A converter 218. Analog signals are once converted into digital signals by the A/D converter 214, and the digital signals are accumulated in the memory 217 and converted into analog signals by the D/A converter 218. Further, the analog signals are sequentially transferred to and displayed on the display unit 105, whereby the display unit 105 can display a live view image (perform through display), and functions as an electronic viewfinder.

Further, the camera 100 includes an inside-viewfinder display unit 219, an inside-viewfinder display driving circuit 220, the outside-viewfinder display unit 104, an outside-viewfinder display driving circuit 221, a non-volatile memory 222, a system memory 223, and a system timer 224. The inside-viewfinder display unit 219 displays via the inside-viewfinder display driving circuit 220 a frame (an AF frame) indicating the position where AF is currently being performed, and an icon indicating the setting state of the camera 100. The outside-viewfinder display unit 104 displays setting values such as the shutter speed and the stop via the outside-viewfinder display driving circuit 221. The non-volatile memory 222 is an electrically erasable and recordable memory. As the non-volatile memory 222, for example, an Electrically Erasable Programmable Read-Only Memory (EEPROM) is used. The non-volatile memory 222 stores a constant for the operation of the system control unit 50, a program, and a threshold. This program is a program for executing the processing of a flow chart described below.

As the system memory 223, for example, a random-access memory (RAM) is used. A constant or a variable for the operation of the system control unit 50 and the program read from the non-volatile memory 222 are loaded into the system memory 223. The system timer 224 is a time measurement unit for measuring the time used for various types of control or the time of a built-in clock.

The system control unit 50, which may include one or more processors, one or more memories, circuitry, or a combination thereof, may control the entire camera 100. The system control unit 50 executes the above program stored in the non-volatile memory 222, thereby achieving processes described below. Further, the system control unit 50 controls the memory 217, the D/A converter 218, and the display unit 105, thereby also performing display control. The system control unit 50 corresponds to an example of a display control unit.

Further, the camera 100 includes operation units for inputting various operation instructions to the system control unit 50, such as the mode selection switch 103, a first shutter switch 225, a second shutter switch 226, and an operation unit 227.

The mode selection switch 103 is an operation unit for switching the modes to any one of the still image capturing mode, the moving image capturing mode, and the reproduction mode. The system control unit 50 sets the mode to the mode selected by the mode selection switch 103. The still image capturing mode includes modes such as an auto image capturing mode, an auto scene distinction mode, a manual mode, a stop-priority mode (an Av mode), a shutter speed-priority mode (a Tv mode), and a diorama image capturing mode. Further, the still image capturing mode includes various scene modes in which image capturing settings are made according to image capturing scenes, a program AE mode, and a custom mode. The still image recording mode can be directly switched to any one of the above modes using the mode selection switch 103. Further, after the still image recording mode is once switched to a menu button using the mode selection switch 103, the still image recording mode may be switched to any one of the above modes included in the menu button, using another operation unit. Similarly, the moving image capturing mode may also include a plurality of modes.

The first shutter switch 225 is turned on in the middle of an operation, i.e., by a half press (an image capturing preparation instruction), of the shutter button 101 and generates a first shutter switch signal SW1. Based on the first shutter switch signal SW1, the system control unit 50 starts the operation of an AF process, an AE process, an AWB process, or an EF process.

The second shutter switch 226 is turned on by the completion of the operation, i.e., by a full press (an image capturing instruction), of the shutter button 101 and generates a second shutter switch signal SW2. Based on the second shutter switch signal SW2, the system control unit 50 starts a series of operations of an image capturing process from the reading of a signal from the image capturing unit 213 to the writing of image data to a storage medium 240.

The operation unit 227 is various operation members serving as an input unit for receiving operations from the user. The operation unit 227 is appropriately assigned functions for corresponding scenes by the user performing the operation of selecting various function icons displayed on the display unit 105 and acts as various function buttons. The function buttons include, for example, an end button, a return button, an advance-image button, a jump button, a narrow-down button, a change-attributes button, a finalize button, and a reset button. For example, if the menu button is pressed, a menu screen where various settings can be made is displayed on the display unit 105. The user can intuitively make various settings using the menu screen displayed on the display unit 105, the directional pad 108, and the SET button 109. The operation unit 227 includes, for example, the shutter button 101, the main electronic dial 102, the power switch 106, the sub electronic dial 107, the directional pad 108, the SET button 109, and the multi-controller 110. Further, the operation unit 227 includes, for example, the live view button 111, the enlargement button 112, the reduction button 113, and the reproduction button 114.

The operation unit 227 includes a touch panel 227a which detects contact on the display unit 105. The touch panel 227a detects the input operation of a position to the display surface of the display unit 105. The touch panel 227a and the display unit 105 can be formed integrally. For example, the touch panel 227a is attached to an upper layer of the display surface of the display unit 105 so that the transmittance of light does not hinder the display of the display unit 105. Then, input coordinates on the touch panel 227a are associated with display coordinates on the display unit 105, whereby it is possible to configure a graphical user interface (GUI) as if the user can directly operate a screen displayed on the display unit 105. The touch panel 227a can use any of various methods such as a resistive method, a capacitive method, a surface acoustic wave method, an infrared method, an electromagnetic induction method, an image recognition method, and a photosensor method. Further, although a method for detecting the presence of a touch according to the presence of contact with the touch panel 227a, or a method for detecting the presence of a touch according to the presence of the approach of a finger or a pen to the touch panel 227a is included depending on the method, either method may be used.

The system control unit 50 can detect the following operations on the touch panel 227a or the following states.
(1) The state where a finger or a pen that was not touching the touch panel 227a newly touches the touch panel 227a, i.e., the start of a touch (a touch-down).
(2) The state where the finger or the pen touches the touch panel 227a (a touch-on).
(3) The state of moving the finger or the pen while the finger or the pen keeps touching the touch panel 227a (a touch move).
(4) The state of separating the finger or the pen that has been touching the touch panel 227a from the touch panel 227a, i.e., the end of a touch (a touch-up).
(5) The state where nothing touches the touch panel 227a (a touch-off).

If a touch-down is detected, simultaneously, a touch-on is detected. After the touch-down, normally, the touch-on continues to be detected unless a touch-up is detected. A touch move is also detected in the state where a touch-on is detected. Even when a touch-on is detected, if the touch position does not move, a touch move is not detected. After a touch-up of all the fingers or the pen that has been touching the touch panel 227a is detected, a touch-off is detected.

The system control unit 50 is notified via an internal bus of the above operations or states and the position coordinates where the finger or the pen touches the touch panel 227a. Based on the notified information, the system control unit 50 determines what operation is performed on the touch panel 227a. In the case of a touch move, the system control unit 50 determines, based on changes in the coordinates, the moving direction of the finger or the pen moving on the touch panel 227a with respect to each of the vertical and horizontal components on the touch panel 227a. If a touch move performed by a predetermined distance or more is detected, the system control unit 50 determines that a slide operation (a drag) is performed. The operation of quickly moving the finger by some distance while the finger keeps touching the touch panel 227a, and then separating the finger from the touch panel 227a immediately after the quick movement is referred to as a "flick". In other words, a flick is the operation of quickly tracing the touch panel 227a with the finger in a flipping manner. If a touch move performed by a predetermined distance or more at a predetermined speed or more is detected, and a touch-up is detected immediately after the touch move, the system control unit 50 determines that a flick is performed (can determine that a flick is performed following a drag). Further, a touch operation for simultaneously touching a plurality of places (e.g., two points) and bringing the touch positions close to each other is referred to as a "pinch-in", and a touch operation for separating the touch positions from each other is referred to as a "pinch-out". A pinch-out and a pinch-in are collectively referred to as a "pinch operation" (or simply as a "pinch").

Further, the camera 100 includes a power supply control unit 228, a power supply unit 229, a storage medium interface (I/F) 230, a communication unit 231, and an orientation detection unit 232. The power supply control unit 228 includes a battery detection circuit, a direct-current-to-direct-current (DC/DC) converter, and a switch circuit for switching blocks to apply a current to. The power supply control unit 228 detects the presence or absence of attachment of a battery, the type of a battery, and the remaining life of a battery. Further, the power supply control unit 228 controls the DC/DC converter based on these detection results and an instruction from the system control unit 50 and supplies a voltage to the components, including the storage medium 240, for a period of time. The power supply unit 229 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter. The storage medium I/F 230 is an interface with the storage medium 240 such as a memory card or a hard disk. The storage medium 240 is a storage medium, such as a memory card, for storing a captured image and is a semiconductor memory or a magnetic disk. The communication unit 231 connects the camera 100 to an external device wirelessly or via a cable for a wired connection, and transmits and receives a video signal or a sound signal. Further, the communication unit 231 can transmit an image (including a live view image) captured by the image capturing unit 213 or an image stored in the storage medium 240, or receive image data or various other pieces of information from an external device. The communication unit 231 can also connect to a wireless local area network (LAN) or the Internet.

The orientation detection unit 232 detects the orientation of the camera 100 relative to the direction of gravity. Based on the orientation detected by the orientation detection unit 232, the system control unit 50 can distinguish an image captured by the image capturing unit 213 as an image captured by holding the camera 100 horizontally or an image captured by holding the camera 100 vertically. The system control unit 50 can add direction information according to the orientation detected by the orientation detection unit 232 to image data captured by the image capturing unit 213 or store an image by rotating the image based on the orientation detected by the orientation detection unit 232. As the orientation detection unit 232, an acceleration sensor or a gyro sensor can be used.

The camera 100 according to the present exemplary embodiment allows the user to make various settings regarding the capturing of an image. The system control unit 50 changes various settings based on the operation of the user changing the position of an item displayed on the display unit 105, using the operation unit 227.

A description will be given below of an AF frame setting and a diorama frame setting as examples of the various settings regarding the capturing of an image.

First, the AF frame setting is made by displaying an AF frame setting screen in a normal mode in the still image capturing mode. The "normal mode" is a mode other than the diorama image capturing mode.

In the AF frame setting, an AF frame is set by the user moving the AF frame to the position on which the user wants to focus and finalizing the moved AF frame. The AF frame is displayed in a superimposed manner on a live view image displayed on the display unit 105. In the present exemplary embodiment, in the AF frame setting made in the normal mode in the still image capturing mode, the AF frame can be set.

The diorama frame setting is made by displaying a diorama frame setting screen in the diorama image capturing mode in the still image capturing mode. The "diorama image capturing mode" is a mode of applying a blurring effect (a diorama effect) to outside an area set in a part of an image, thereby allowing the capturing of an image such as a miniature photograph.

In the diorama frame setting, a diorama frame is set by, in the capturing of a diorama image, the user moving the diorama frame to the position where the user wants to apply the blurring effect and finalizing the moved diorama frame. The diorama frame is displayed in a superimposed manner on a live view image displayed on the display unit 105. In the present exemplary embodiment, in the diorama frame setting made in the diorama image capturing mode in the still image capturing mode, after the diorama frame is set, the diorama frame setting subsequently shifts to the AF frame setting, in which the AF frame is set. That is, in the beginning, the diorama frame can be set, and next (after the beginning), the AF frame can be set.

The AF frame setting screen will be described.

Figure 3A:
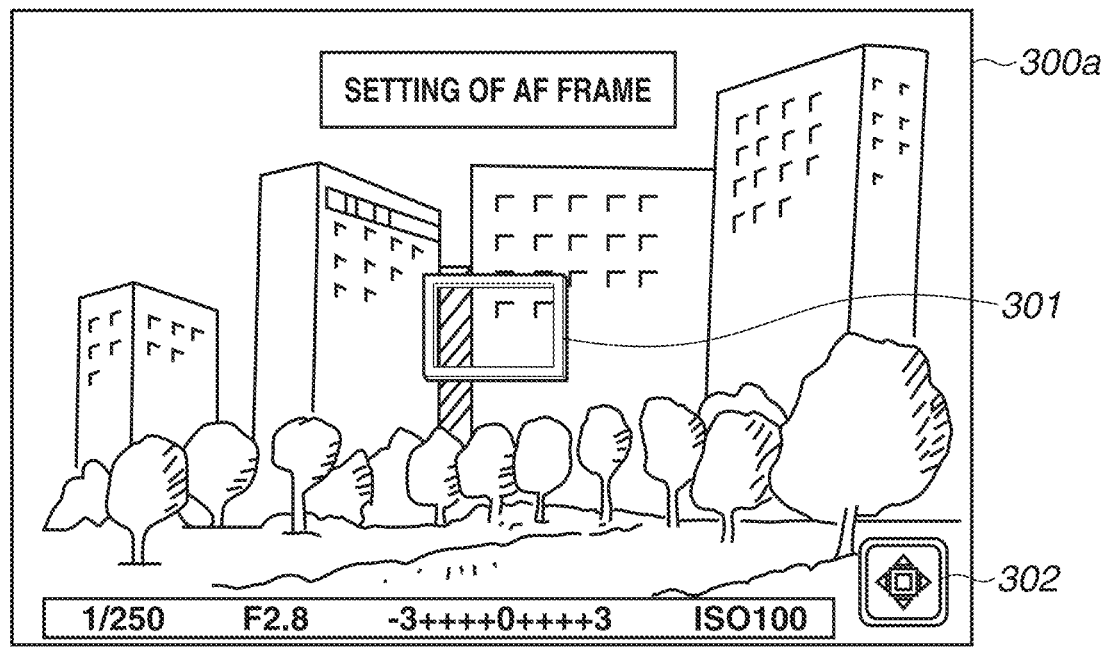
FIGS. 3A and 3B are diagrams illustrating examples of autofocus (AF) frame setting screens in a normal mode.
Figure 3B:
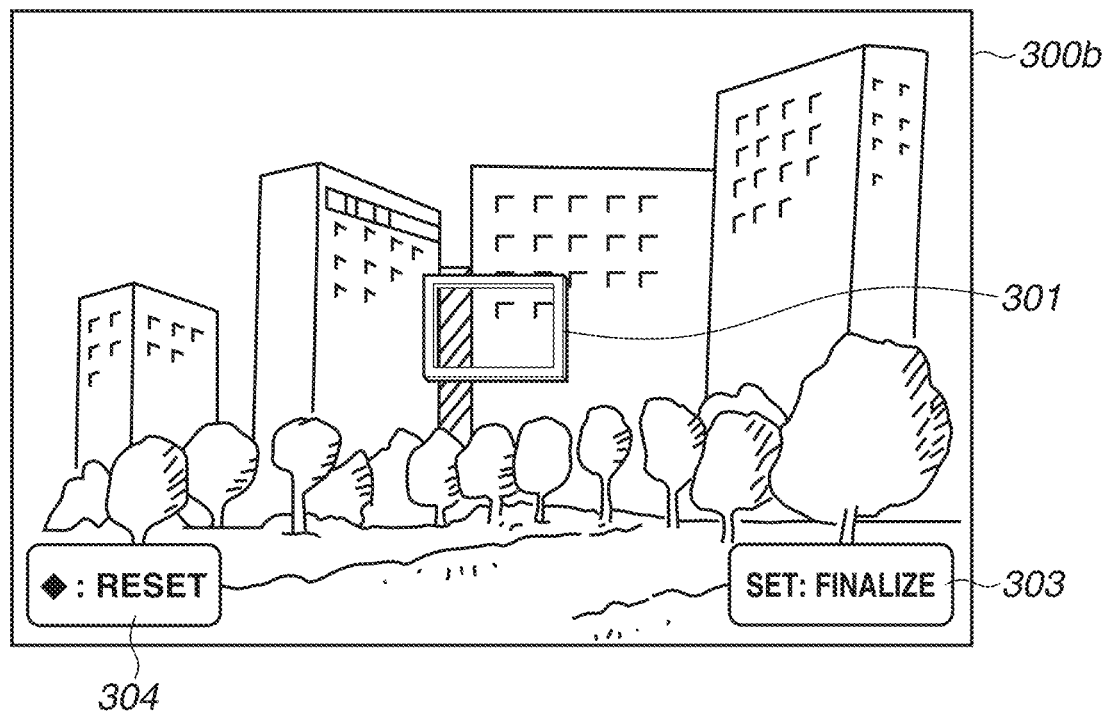

FIG. 3A is a diagram illustrating an image capturing standby screen 300a in the normal mode in the still image capturing mode. On the image capturing standby screen 300a, an AF frame 301 and an AF frame setting shifting button 302 are displayed in a superimposed manner on a live view image. The user visually confirms the AF frame 301 and thereby can recognize that the position of the AF frame 301 comes into focus. To change the position of the AF frame 301, the user touches the AF frame setting shifting button 302. When the user touches the AF frame setting shifting button 302, this state shifts to the AF frame setting, and the image capturing standby screen 300a transitions to an AF frame setting screen 300b in FIG. 3B.

On the AF frame setting screen 300b, the AF frame 301, a finalize button 303, and a reset button 304 are displayed in a superimposed manner on the live view image. The finalize button 303 and the reset button 304 are buttons that the user can touch (touch buttons).

The user can move the AF frame 301 using the touch panel 227a or the directional pad 108. At this time, as the position of the AF frame 301 is changed, the positions of the touch buttons are changed so that the touch buttons do not overlap the AF frame 301. The relationships between the positions of the touch buttons and the display position of the AF frame will be described below with reference to FIGS. 5A to 5F. When the user touches the finalize button 303, the AF frame 301 is set at the position to which the AF frame 301 is moved. Then, the AF frame setting ends, and the AF frame setting screen 300b transitions to the image capturing standby screen 300a in FIG. 3A.

Next, the diorama frame setting screen will be described.

Figure 4A:
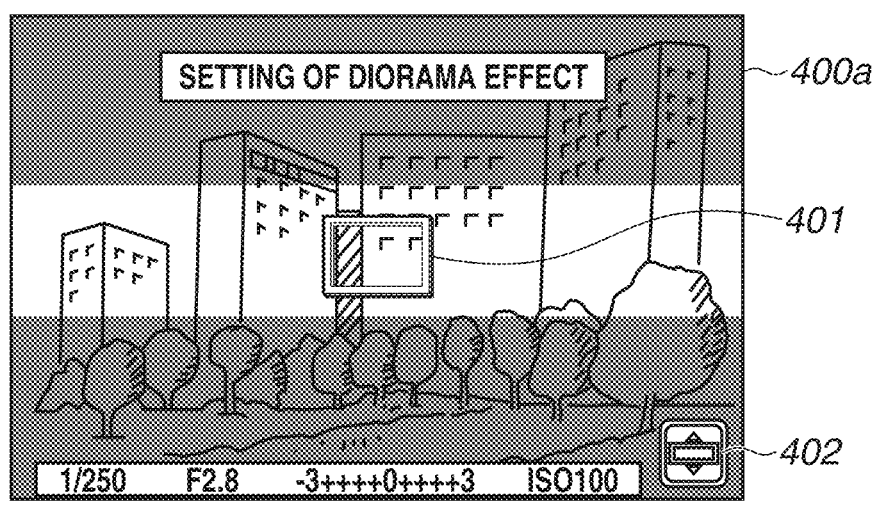
FIGS. 4A, 4B, and 4C are diagrams illustrating examples of diorama frame setting screens in a diorama image capturing mode.
Figure 4B:
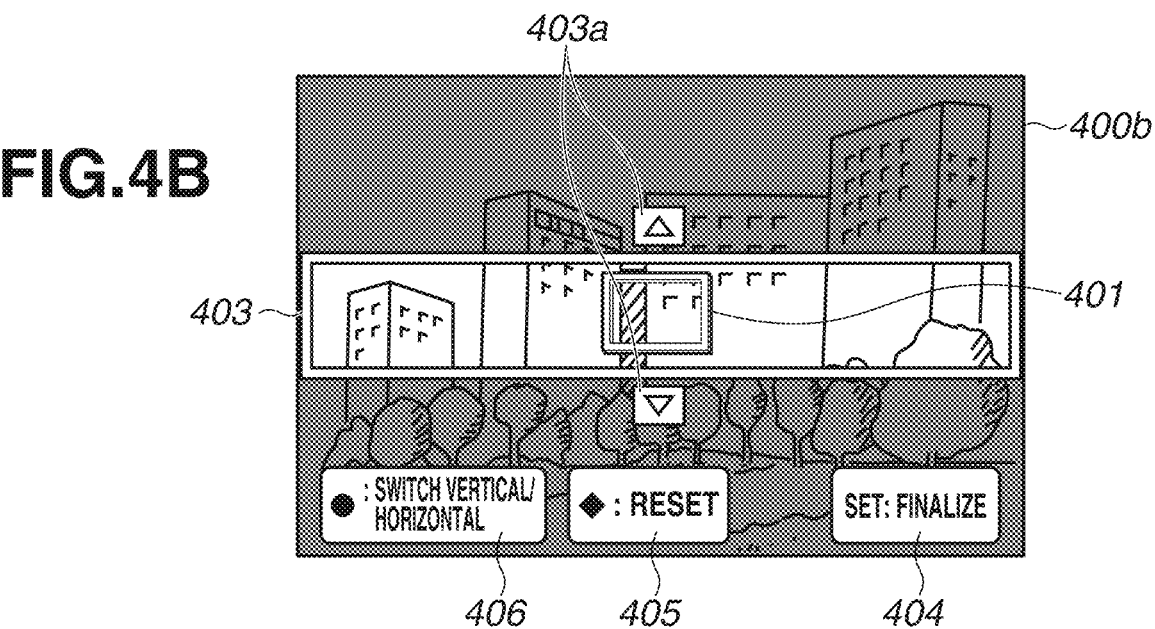

FIG. 4A is a diagram illustrating an image capturing standby screen 400a in the diorama image capturing mode in the still image capturing mode. On the image capturing standby screen 400a, an AF frame 401 and a diorama frame setting shifting button 402 are displayed in a superimposed manner on a live view image. Further, the live view image is displayed by applying the blurring effect to upper and lower areas of the live view image. In the present exemplary embodiment, to illustrate the areas to which the blurring effect is applied in an easily understandable manner, the live view image is shaded in gray. Actually, however, these areas are the areas to which the blurring effect is applied, and a gray image is not displayed in a superimposed manner on the live view image. The user visually confirms the live view image and thereby can recognize the positions where the blurring effect is applied (blurring positions). To change the blurring positions, the user touches the diorama frame setting shifting button 402. When the user touches the diorama frame setting shifting button 402, this state shifts to the diorama frame setting, and the image capturing standby screen 400a transitions to a diorama frame setting screen 400b in FIG. 4B.

On the diorama frame setting screen 400b, the AF frame 401, a diorama frame 403, arrows 403a, a finalize button 404, a reset button 405, and a switch-vertical/horizontal button 406 are displayed in a superimposed manner on the live view image. The diorama frame 403 is a frame indicating that the blurring effect is applied to areas (gray portions in FIG. 4B) outside the frame. The arrows 403a are items indicating that the diorama frame 403 is movable. The finalize button 404, the reset button 405, and the switch-vertical/horizontal button 406 correspond to examples of a predetermined item. Further, the finalize button 404, the reset button 405, and the switch-vertical/horizontal button 406 are buttons that the user can touch (touch buttons).

Figure 4C:
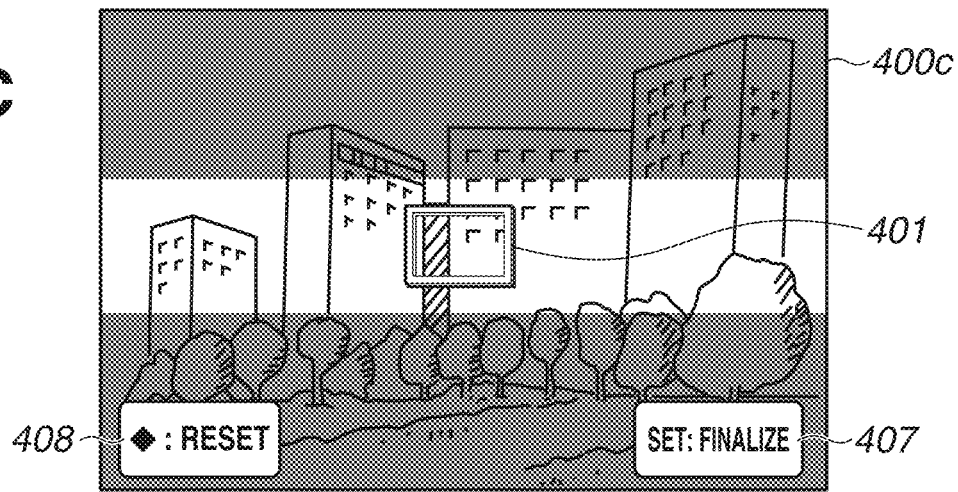

The user can move the diorama frame 403 using the touch panel 227a or the directional pad 108. At this time, as the position of the diorama frame 403 is changed, the touch buttons are displayed with the positions of the touch buttons being changed so that the touch buttons do not overlap the diorama frame 403. A form in which the touch buttons are displayed with the positions of the touch buttons being changed will be described below with reference to FIGS. 5A to 5F. When the user touches the finalize button 404, the diorama frame 403 is set at the position to which the diorama frame 403 is moved. Then, the diorama frame setting ends, and the diorama frame setting subsequently shifts to the AF frame setting. Then, the diorama frame setting screen 400b transitions to an AF frame setting screen 400c in FIG. 4C.

On the AF frame setting screen 400c, the AF frame 401, a finalize button 407, and a reset button 408 are displayed in a superimposed manner on the live view image. Further, the finalize button 407 and the reset button 408 are buttons that the user can touch (touch buttons).

Figure 6:
FIG. 6, which includes

In the present exemplary embodiment, when the diorama frame setting subsequently shifts to the AF frame setting, and the diorama frame setting screen 400b transitions to the AF frame setting screen 400c, the display positions of the finalize button 407 and the reset button 408 are not changed according to the position of the AF frame 401, in a state immediately after the screen transitions to AF frame setting screen 400c. That is, the finalize button 407 and the reset button 408 do not move from the positions where the finalize button 404 and the reset button 405 are displayed immediately before the position of the diorama frame 403 is set on the diorama frame setting screen 400b where the position of the diorama frame 403 is set. On the other hand, after the diorama frame setting screen 400b transitions to the AF frame setting screen 400c, and if the position of the AF frame 401 is changed by the user, the positions of the finalize button 407 and the reset button 408 are changed so that the finalize button 407 and the reset button 408 do not overlap the AF frame 401. This processing will be described below with reference to the flowchart in FIG. 6, which includes FIGS. 6A, 6B, and 6C.

When the user touches the finalize button 407, the AF frame 401 is set at the position to which the AF frame 401 is moved. Then, the AF frame setting ends, and the AF frame setting screen 400c transitions to the image capturing standby screen 400a in FIG. 4A.

Next, with reference to diorama frame setting screens 500a to 500c illustrated in FIGS. 5A to 5C, a description will be given of an example of a case where touch buttons are displayed with the positions of the touch buttons being changed according to the position of the diorama frame.

FIGS. 5A to 5C are diagrams illustrating diorama frame setting screens 500a, 500b, and 500c, which are displayed by shifting to the diorama frame setting. On the diorama frame setting screens 500a to 500c, an AF frame 401, a diorama frame 403, arrows 403a, a finalize button 404, a reset button 405, a switch-vertical/horizontal button 406, and an indicator 501 are displayed. In FIGS. 5A to 5C, the AF frame 401, the diorama frame 403, the finalize button 404, the reset button 405, and the switch-vertical/horizontal button 406 are designated by the same signs as those in the diorama frame setting screen 400b in FIG. 4B. Further, on the diorama frame setting screens 500a to 500c in FIGS. 5A to 5C, the AF frame 401 is displayed at a position close to the upper right corner of each screen. Further, actually, the indicator 501 may be hidden.

The indicator 501 is located at the center of the diorama frame 403 and indicates the position of the diorama frame 403. In this case, the position of the indicator 501 is represented by taking the upper left corner of the diorama frame setting screen 500a as an origin 0, where the horizontal direction is an X-axis and the vertical direction is a Y-axis.

The reset button 405 is a touch button for resetting the diorama frame 403. In the state where the position of the diorama frame 403 is changed from the center as illustrated in FIG. 5B, when the user touches the reset button 405, the diorama frame 403 returns to an initial position where the diorama frame 403 is located at the center position of the display unit 105 as illustrated in FIG. 5A. The switch-vertical/horizontal button 406 in FIGS. 5A to 5C is a touch button for switching the diorama frame 403 from horizontal (horizontally long) to vertical (vertically long) or from vertical to horizontal. In a horizontal state as illustrated in FIG. 5A or 5B, when the user touches the switch-vertical/horizontal button 406, the diorama frame 403 switches to a vertical state as illustrated in FIG. 5C. In the states illustrated in FIGS. 5A and 5B, the blurring effect is applied above and below the diorama frame 403. In the state illustrated in FIG. 5C, the blurring effect is applied to the left and right of the diorama frame 403.

The finalize button 404, the reset button 405, and the switch-vertical/horizontal button 406 are not limited to touch buttons, and may be guide display items for guiding the user on which button should be operated.

Next, with reference to AF frame setting screens 500d to 500f illustrated in FIGS. 5D to 5F, a description will be given of an example of a case where touch buttons are displayed with the positions of the touch buttons being changed according to the position of the AF frame.

FIGS. 5D to 5F are diagrams illustrating AF frame setting screens 500d, 500e, and 500f, which are displayed by shifting to the AF frame setting. On the AF frame setting screen 500d, an AF frame 301, a finalize button 303, a reset button 304, and an indicator 502 are displayed. The AF frame 301, the finalize button 303, and the reset button 304 are designated by the same signs as those in the AF frame setting screen 300b in FIG. 3B. Further, actually, the indicator 502 may be hidden.

The indicator 502 is located at the center of the AF frame 301 and indicates the position of the AF frame 301. In this case, the position of the indicator 502 is represented by taking the upper left corner of the AF frame setting screen 500d as an origin 0 at, where the horizontal direction is an X-axis and the vertical direction is a Y-axis.

The reset button 304 is a touch button for resetting the AF frame 301. In the state where the position of the AF frame 301 is changed from the center as illustrated in FIG. 5E, when the user touches the reset button 304, the AF frame 301 returns to an initial position where the AF frame 301 is located at the center position of the display unit 105 as illustrated in FIG. 5D.

The finalize button 303 and the reset button 304 are not limited to touch buttons, and may be guide display items for guiding the user on which button should be operated.

Figure 6A:
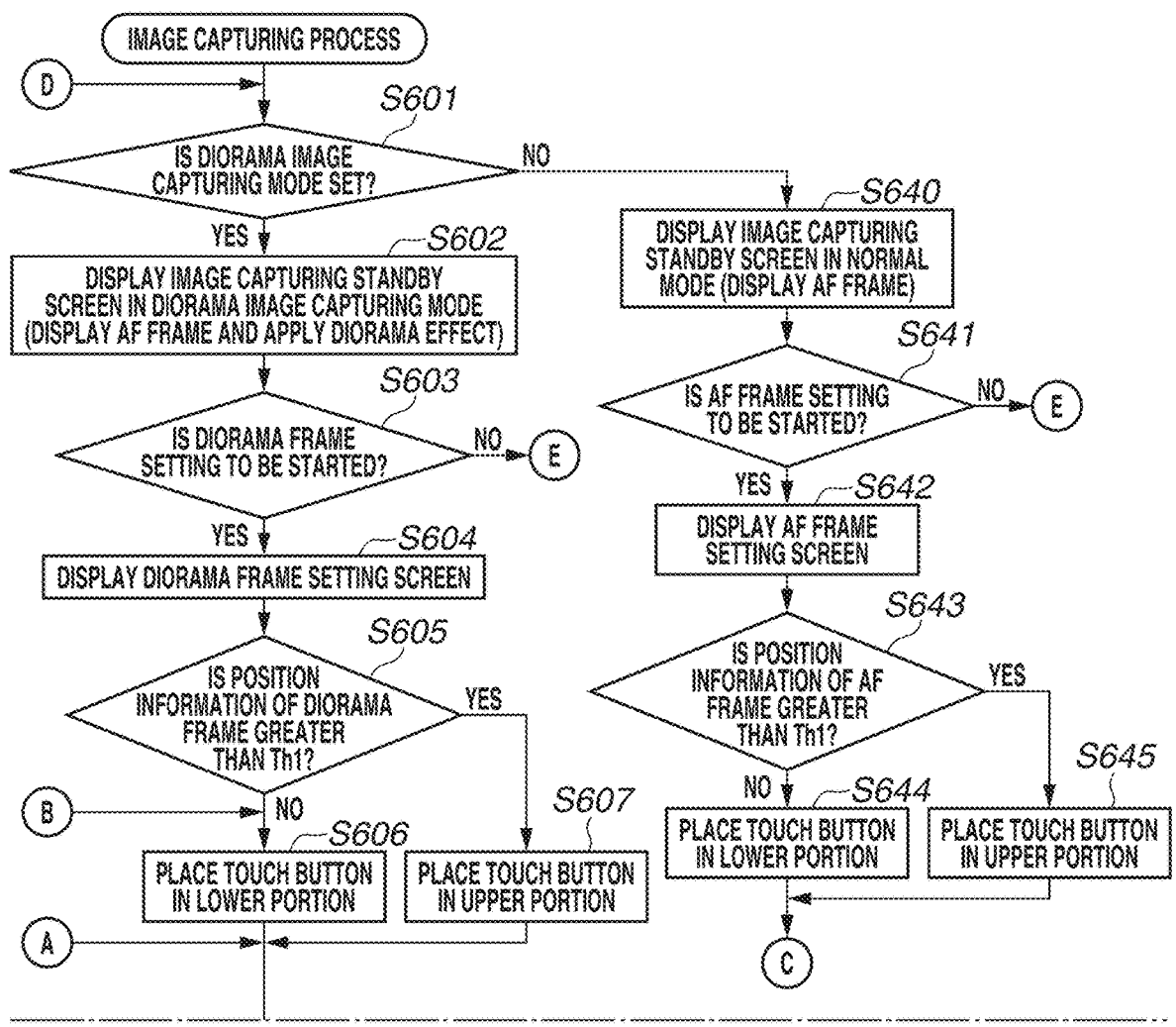
FIGS. 6A, 6B, and 6C, illustrates a flowchart of an example of an image capturing process by the camera.
Figure 6B:
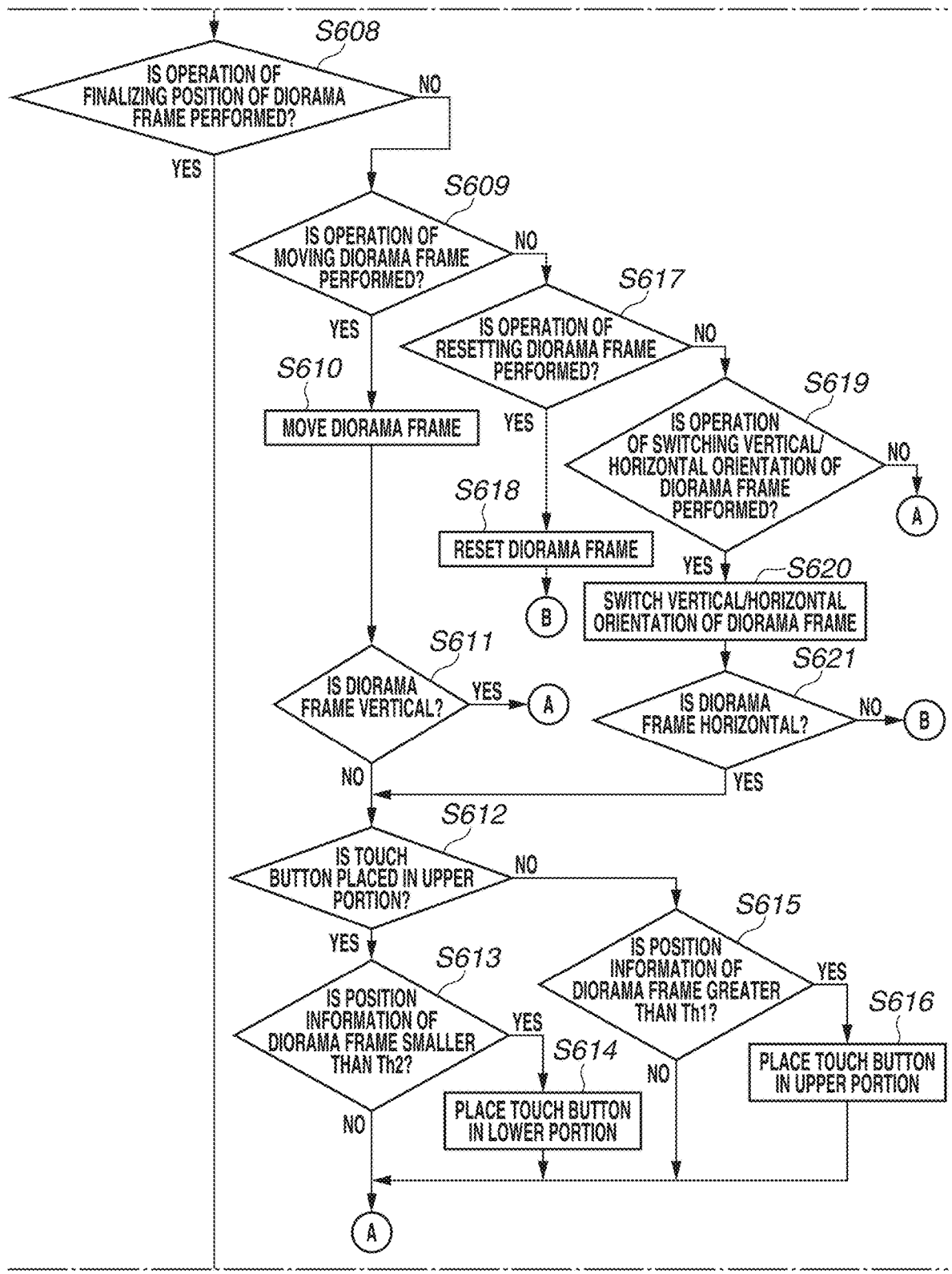
Figure 6C:
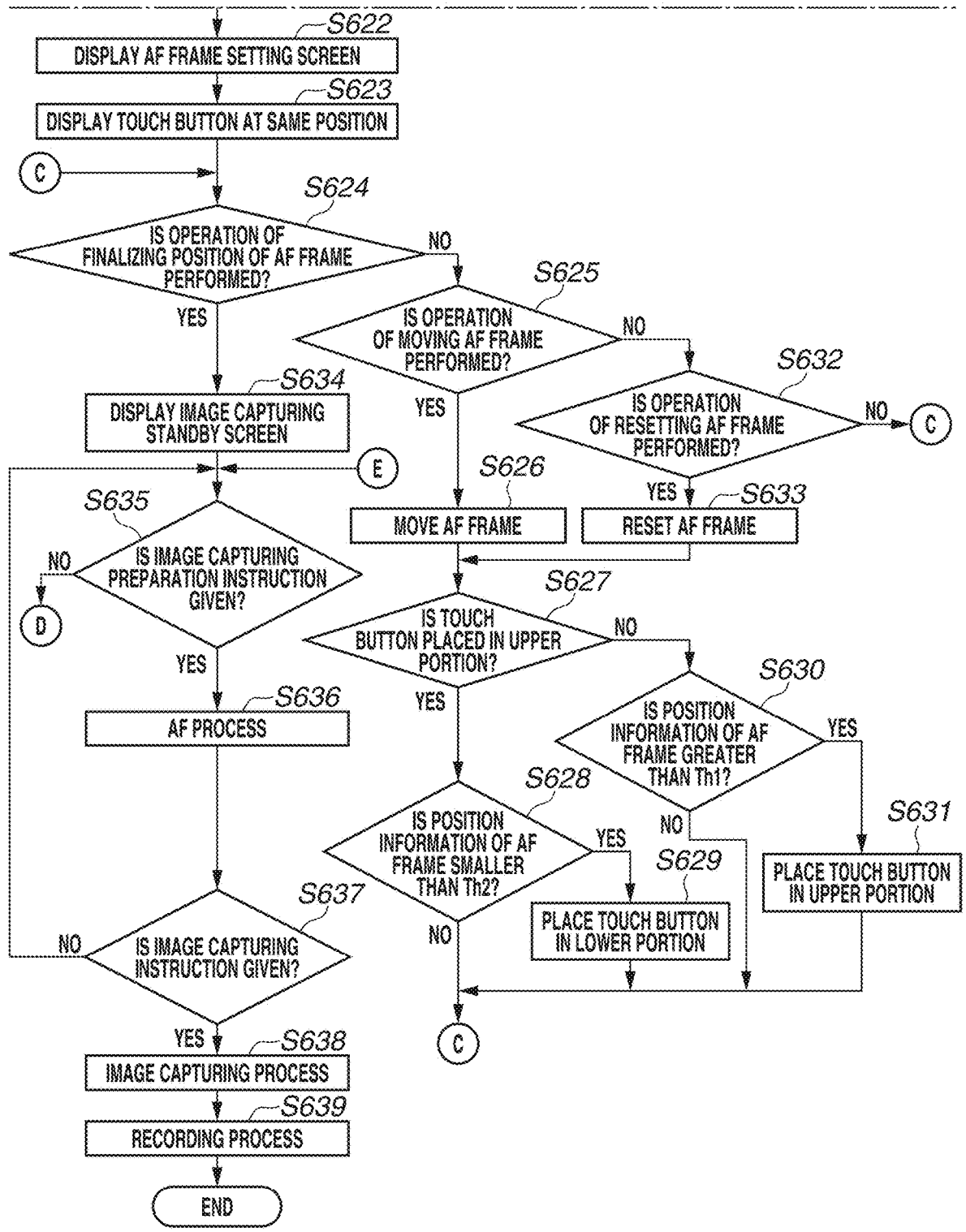

Next, with reference to the flowchart in FIGS. 6A, 6B, and 6C, a description will be given of an example of an image capturing process by the camera 100 according to the present exemplary embodiment. The flowchart in FIGS. 6A, 6B, and 6C is achieved by the system control unit 50 loading the program stored in the non-volatile memory 222 into the system memory 223 and executing the program. The flowchart in FIGS. 6A, 6B, and 6C is started by switching the mode to the still image capturing mode using the mode selection switch 103.

In step S601, the system control unit 50 determines whether the diorama image capturing mode is set in the still image capturing mode. Here, a mode other than the diorama image capturing mode is considered as the normal mode. If the diorama image capturing mode is set (Yes in step S601), the processing proceeds to step S602. If the normal mode is set (No in step S601), the processing proceeds to step S640.

In step S602, the system control unit 50 displays an image capturing standby screen in the diorama image capturing mode. On the image capturing standby screen in the diorama image capturing mode, the system control unit 50 displays a diorama frame and an AF frame that are currently set on a live view image, and displays an image of areas outside the diorama frame by applying a blurring effect to the image. This enables the user to recognize an area to which the blurring effect is applied and an area to which the blurring effect is not applied. Further, in step S602, the system control unit 50 displays a diorama frame setting shifting button in a superimposed manner on the live view image. In step S602, for example, the system control unit 50 displays the image capturing standby screen 400a in the diorama image capturing mode illustrated in FIG. 4A. Specifically, the system control unit 50 reads position information of indicators of the diorama frame and the AF frame from the non-volatile memory 222 and displays the diorama frame and the AF frame based on the read information. The non-volatile memory 222 stores position information of initial positions of the diorama frame and the AF frame in advance. However, in a case where the user has set the diorama frame and the AF frame, the non-volatile memory 222 stores the position information of the indicators of the diorama frame and the AF frame that are previously set.

In step S603, the system control unit 50 determines whether a diorama frame setting is to be started. The diorama frame setting is started by the user touching the diorama frame setting shifting button 402 illustrated in FIG. 4A. If the diorama frame setting is to be started (Yes in step S603), the processing proceeds to step S604. If the diorama frame setting is not to be started (No in step S603), the processing proceeds to step S635.

In step S604, the system control unit 50 displays a diorama frame setting screen. On the diorama frame setting screen, the system control unit 50 displays the diorama frame based on the position information of the indicator of the diorama frame and displays arrows indicating that the diorama frame is movable. In step S604, as illustrated in the diorama frame setting screen 400b in FIG. 4B, the system control unit 50 displays the arrows 403a together with the diorama frame 403.

In step S605, the system control unit 50 determines whether the position information of the diorama frame is greater than a threshold Th1. This determination is made to determine the position where a touch button is to be displayed in a case where the image capturing standby screen transitions to the diorama frame setting screen, and the diorama frame has not yet been moved by the user. If the position information of the indicator 501 of the diorama frame (the center of the diorama frame) is greater than the threshold Th1, i.e., if the diorama frame is located in an area on the lower side of the screen (Yes in step S605), the processing proceeds to step S607. If not (No in step S605), the processing proceeds to step S606. If the diorama frame is vertical, the determination is No in step S605, regardless of the position of the diorama frame. The threshold Th1 is located below the center of the display unit 105. This is to display a touch item on the lower side of the display unit 105 (the opposite side of Y=0) in a case where the previous screen transitions for the first time to the screen where the diorama frame is to be moved. As illustrated in FIG. 4A, on the screen before step S605, a touch button and an item are displayed on the lower side of the display unit 105. Thus, a threshold is set to display the item on the lower side also after the screen transitions. The diorama frame, however, is movable also to the lower side of the display unit 105. Thus, in this case, to distinguish between a touch for moving the diorama frame and a touch on the touch button, and also to improve visibility, the system control unit 50 displays the touch button on the upper side of the display unit 105. As described above, to maintain both the operability for the user and visibility, the threshold Th1 is applied in step S605.

In step S606, the system control unit 50 places the touch button in a lower portion of the screen and stores, in the system memory 223, information indicating that the position of the touch button is in the lower portion. In step S606, as illustrated in FIG. 5A, the system control unit 50 places the finalize button 404, the reset button 405, and the switch-vertical/horizontal button 406 (touch buttons) in a lower portion and along the lower side of the screen. Further, if the diorama frame 403 is vertical as illustrated in FIG. 5C, the indicator 501 is always located above the threshold Th1. Thus, the finalize button 404, the reset button 405, and the switch-vertical/horizontal button 406 are not changed, remaining in the state of FIG. 5C.

In step S607, the system control unit 50 places the touch button in an upper portion of the screen and stores, in the system memory 223, information indicating that the position of the touch button is in the upper portion. In step S607, as illustrated in FIG. 5B, the system control unit 50 places the finalize button 404, the reset button 405, and the switch-vertical/horizontal button 406 (touch buttons) in an upper portion and along the upper side of the screen.

Steps S608 to S621 are processes performed in response to an operation of the user on the diorama frame setting screen.

In step S608, the system control unit 50 determines whether the operation of finalizing the position of the diorama frame is performed. For example, using the SET button 109 of the operation unit 227 or by touching the finalize button 404 illustrated in FIGS. 5A to 5C, the user performs the operation of finalizing the position of the diorama frame. If the operation of finalizing the position of the diorama frame is performed (Yes in step S608), the processing proceeds to step S622. If the operation is not performed (No in step S608), the processing proceeds to step S609.

In step S609, the system control unit 50 determines whether the operation of moving the diorama frame is performed. For example, by moving the diorama frame using the directional pad 108 of the operation unit 227, or by directly touching the position to which the user wants to move the diorama frame, using the touch panel 227a, the user performs the operation of moving the diorama frame. If the operation of moving the diorama frame is performed (Yes in step S609), the processing proceeds to step S610. If the operation is not performed (No in step S609), the processing proceeds to step S617.

In step S610, according to the operation of moving the diorama frame, the system control unit 50 moves the diorama frame and changes the positions where the blurring effect is applied. According to the movement of the diorama frame, the system control unit 50 sequentially stores the position information of the indicator of the diorama frame in the system memory 223.

In step S611, the system control unit 50 determines whether the diorama frame is vertical. If the diorama frame is vertical, the position of the touch button is not to be changed. Thus, the process of changing the display position of the touch button in and after step S612 is not performed. If the diorama frame is vertical (Yes in step S611), the processing returns to step S608. If the diorama frame is not vertical (No in step S611), the processing proceeds to step S612.

In step S612, based on the information stored in the system memory 223, the system control unit 50 determines whether the touch button is placed in the upper portion of the screen. If the touch button is placed in the upper portion of the screen (Yes in step S612), the processing proceeds to step S613. If the touch button is not placed in the upper portion (No in step S612), the processing proceeds to step S615.

In step S613, the system control unit 50 determines whether the position information of the diorama frame is smaller than a threshold Th2. Specifically, the system control unit 50 makes the determination based on the position information of the indicator of the diorama frame and the threshold Th2 stored in the non-volatile memory 222 in advance. If the position information of the diorama frame is smaller than the threshold Th2, i.e., if the position of the diorama frame is located above the threshold Th2, which is at the center position in the Y-axis direction of the display unit 105 (Yes in step S613), the processing proceeds to step S614. If the position information of the diorama frame is greater than the threshold Th2 (No in step S613), the system control unit 50 does not move the touch button, and the processing returns to step S608. The relationship between the thresholds is Th1≥Th2 in the Y-coordinate direction.

In step S614, the system control unit 50 places the touch button in the lower portion of the screen and stores, in the system memory 223, information indicating that the position of the touch button is in the lower portion.

In step S615, the system control unit 50 determines whether the position information of the diorama frame is greater than the threshold Th1. Specifically, the system control unit 50 makes the determination based on the position information of the indicator of the diorama frame and the threshold Th1 stored in the non-volatile memory 222 in advance. If the position information of the diorama frame is greater than the threshold Th1, i.e., if the position of the diorama frame is located below the threshold Th1, which is at a position on the lower side of the display unit 105 (Yes in step S615), the processing proceeds to step S616. If the position information of the diorama frame is not greater than the threshold Th1 (No in step S615), the system control unit 50 does not move the touch button, and the processing returns to step S608.

In step S616, the system control unit 50 places the touch button in the upper portion of the screen and stores, in the system memory 223, information indicating that the position of the touch button is in the upper portion.

In steps S612 to S616, the rate at which the touch button is displayed on the lower side is greater. In a case where it is determined in step S612 that the touch button is originally displayed on the upper side, then in step S613, if the position information of the current (moved) diorama frame is smaller than the threshold Th2, which is at the center position of the display unit 105, the touch button is moved to the lower side. That is, in a case where the touch button is originally displayed on the upper side, and if the diorama frame is located on the upper half of the screen, the touch button moves to the lower side. If the diorama frame is located on the lower half of the screen, the touch button remains on the upper side. Thus, the rate at which the touch button moves from the upper side to the lower side is 50% with respect to the range where the diorama frame is movable.

In a case where the diorama frame is originally displayed on the lower side, then in step S615, if the position information of the current (moved) diorama frame is greater than the threshold Th1, which is at a position further on the lower side of the display unit 105, the touch button is moved to the upper side. That is, in a case where the touch button is originally displayed on the lower side, the touch button does not move to the upper side unless the diorama frame moves to a range smaller than half the screen. If the length in the Y-axis direction of the display unit 105 is YY, Th1 is longer than (YY−Th1). Thus, the rate at which the touch button moves from the lower side to the upper side is (YY−Th1)/YY, i.e., less than 50% with respect to the range where the diorama frame is movable. That is, when the diorama frame is moved, the rate at which the touch button remains displayed on the lower side is greater.

Further, the range of the diorama frame causing the touch button to move to the upper side is Th1≤y≤YY (=less than half the screen), whereas the range of the diorama frame causing the touch button to move to the lower side is 0≤y≤Th2 (=half the screen). The touch button is thus made likely to be displayed on the lower side, whereby the touch button is more likely to be displayed on the lower side as is the case with the screen illustrated in FIG. 4A before transitioning to the process of setting the diorama frame. This improves visibility and operability. Further, if the rate at which the touch button is displayed on the lower side is greater, and when the user holding the display unit 105 from the lower side touches the touch button, the user can touch the touch button without stretching their finger (hand) from the lower side to the upper side of the display unit 105. This can reduce the rate at which an image is hidden by a finger (hand) performing a touch operation.

In step S617, the system control unit 50 determines whether the operation of resetting the diorama frame is performed. For example, by touching the reset button 405 illustrated in FIG. 5A, the user can perform the operation of resetting the diorama frame. If the operation of resetting the diorama frame is performed (Yes in step S617), the processing proceeds to step S618. If the operation is not performed (No in step S617), the processing proceeds to step S619.

In step S618, the system control unit 50 resets the diorama frame and returns the diorama frame to the center position, which is the initial position. Then, the processing returns to step S606.

In step S619, the system control unit 50 determines whether the operation of switching the vertical/horizontal orientation of the diorama frame is performed. For example, using the operation unit 227 or by touching the switch-vertical/horizontal button 406 illustrated in FIG. 5A, the user performs the operation of switching the vertical/horizontal orientation of the diorama frame. If the operation of switching the vertical/horizontal orientation of the diorama frame is performed (Yes in step S619), the processing proceeds to step S620. If the operation is not performed (No in step S619), the processing returns to step S608.

In step S620, the system control unit 50 switches the vertical/horizontal orientation of the diorama frame from horizontal to vertical or from vertical to horizontal. According to the diorama frame of which the vertical/horizontal orientation has been switched, the system control unit 50 changes the positions where the blurring effect is applied. According to the switching of the vertical/horizontal orientation of the diorama frame, the system control unit 50 sequentially updates, in the system memory 223, information indicating whether the diorama frame is vertical or horizontal.

In step S621, the system control unit 50 determines whether the diorama frame is horizontal. If the diorama frame is horizontal (Yes in step S621), the processing proceeds to step S612. If the diorama frame is not horizontal, i.e., the diorama frame is vertical (No in step S621), the processing returns to step S606.

Next, the processes of step S622 and after that will be described.

Step S622 is a process performed after the position of the diorama frame is finalized in step S608. In step S622, the system control unit 50 displays an AF frame setting screen. That is, in the present exemplary embodiment, if the diorama image capturing mode is set, the diorama frame setting subsequently shifts to an AF frame setting. The system control unit 50 displays the finalized diorama frame and also continuously displays the AF frame displayed in step S602.

In step S623, the system control unit 50 displays a finalize button (a touch button) at the display position of the touch button stored in the system memory 223, regardless of the position of the AF frame. That is, the system control unit 50 displays the finalize button at the display position of the touch button stored in the system memory 223 in the latest process among those of steps S606, S607, S614, and S616. There is a case where the position where the AF frame is displayed in step S602 is not the center position but a position previously set by the user, i.e., a position further on the upper side or the lower side of the display unit 105. In step S623, however, the system control unit 50 determines the display position of the touch button, regardless of the position of the AF frame.

Figure 7A:
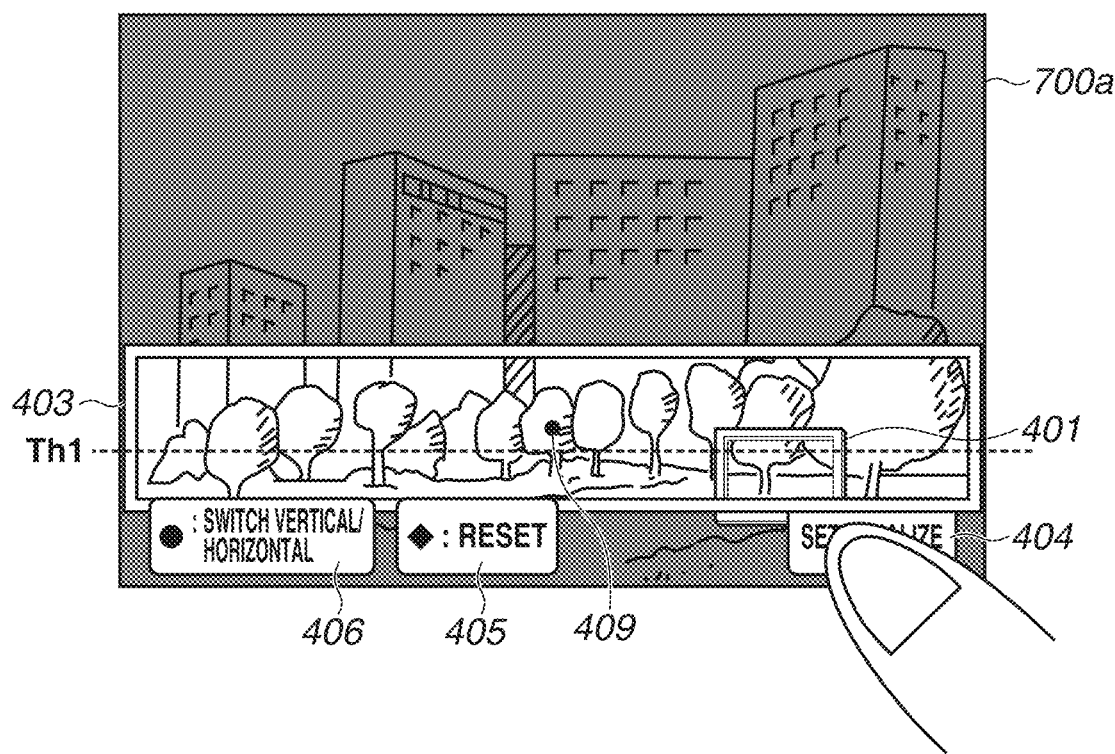
FIGS. 7A and 7B are diagrams illustrating positions of touch buttons.
Figure 7B:
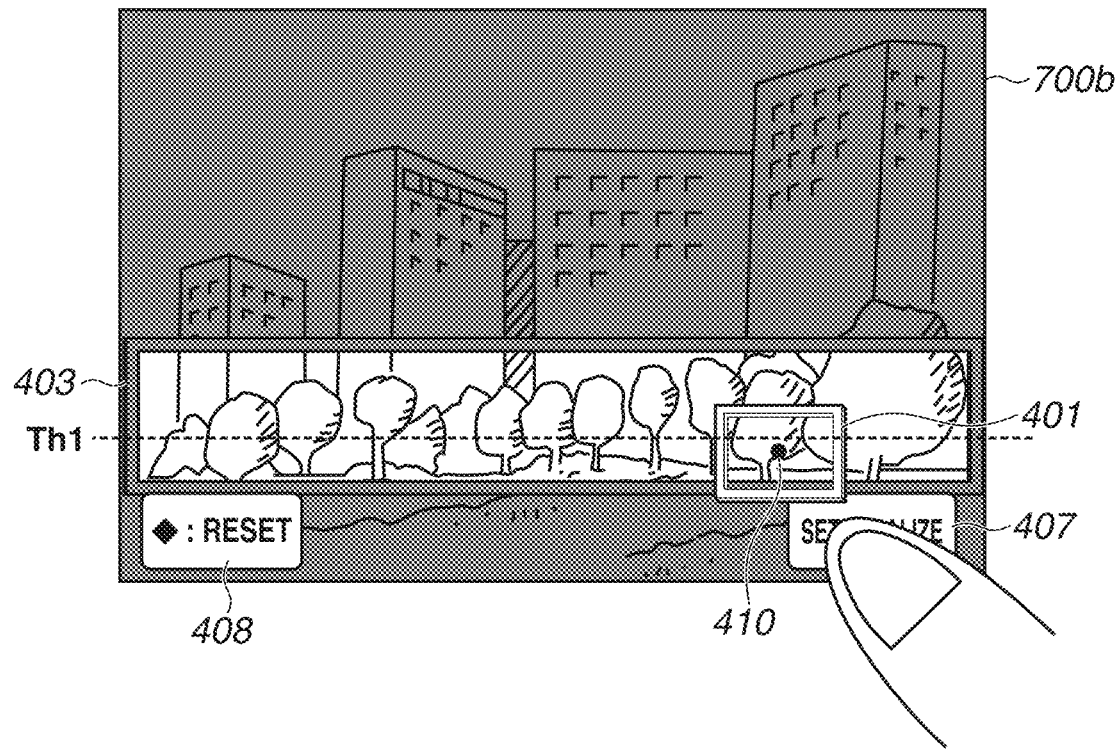

With reference to FIGS. 7A and 7B, a description is given of an example of a case where the diorama frame setting screen transitions to the AF frame setting screen. FIG. 7A is a diagram illustrating an example of a diorama frame setting screen 700a.

On the diorama frame setting screen 700a, position information of an indicator 409 (the center position in the Y-axis direction) of a diorama frame 403 is smaller than the threshold Th1. Thus, touch buttons are placed in a lower portion of the screen. In this case, if the user touches a finalize button 404 to finalize the position of the diorama frame 403 (Yes in step S608), the diorama frame setting screen 700a transitions to an AF frame setting screen (step S622).

FIG. 7B is a diagram illustrating an example of an AF frame setting screen 700b (steps S622 and S623).

The AF frame setting screen 700b is a screen displayed immediately after the diorama frame setting screen 700a illustrated in FIG. 7A transitions according to the operation of finalizing the diorama frame 403 on the diorama frame setting screen 700a. In this case, position information of an indicator 410 (the center position in the Y-axis direction) of an AF frame 401 is greater than the threshold Th1, but a finalize button 407 is placed in a lower portion of the screen. After the operation of finalizing the position of the diorama frame is performed in step S608, then in step S623, the finalize button 407 on the AF frame setting screen 700b is displayed at the same position as the finalize button 404 on the diorama frame setting screen 700a in FIG. 7A. As described above, immediately after the diorama frame setting shifts to the AF frame setting, the finalize button 407 is displayed at the same position as the finalize button 404 for the diorama frame setting. In this way, the user can finalize the AF frame (touch the finalize button) by performing the operation of finalizing the diorama frame (touch the finalize button) and then subsequently touching the same position. That is, to immediately finalize the position of the AF frame 401 without needing to change the position of the AF frame 401, the user can instantaneously touch the finalize button 407. For example, in a case where the user does not need to change the position of the AF frame 401 immediately after the diorama frame setting shifts to the AF frame setting, if the position of the finalize button 407 is determined according to the position of the AF frame 401, there is a possibility that the finalize button on the AF frame setting screen is displayed at a different position from the display position of the finalize button on the diorama frame setting screen immediately before the AF frame setting screen. The user intending to finalize the position of the AF frame without changing the position of the AF frame wants to quickly perform the operation of finalizing the position of the AF frame in step S624. Thus, if the display position of the finalize button is changed, the user needs to perform the operation of searching for the finalize button again and moving their finger to change the position of the finger to touch the finalize button. As in step S623, the display position of the finalize button is not changed from the display position of the finalize button on the diorama frame setting screen immediately before the AF frame setting screen, whereby the user can quickly set the diorama frame and the AF frame by touching the same position twice. Further, in a case where the user recognizes that the display position of the finalize button is the display position of the finalize button on the diorama frame setting screen, and if the display position of the finalize button moves according to transition to the AF frame setting screen, there is a possibility that the user touches the position where the finalize button is not displayed. If the user touches the live view image on which the finalize button is not displayed, the AF frame moves to the touched position, which is a position unintended by the user. On the other hand, as in step S623, the display position of the finalize button is not changed, whereby it is possible to reduce the possibility that the AF frame moves to a position unintended by the user.

The user can change the position of the AF frame 401 in the processes of step S624 and after that.

Referring back to the flowchart in FIG. 6C, the processes of step S624 and after that are described.

Steps S624 to S633 are processes according to an operation of the user on the AF frame setting screen. In step S624, the system control unit 50 determines whether the operation of finalizing the position of the AF frame is performed. For example, using the SET button 109 of the operation unit 227 or by touching the finalize button 407 illustrated in FIG. 7B, the user performs the operation of finalizing the position of the AF frame. If the operation of finalizing the position of the AF frame is performed (Yes in step S624), the processing proceeds to step S634. If the operation is not performed (No in step S624), the processing proceeds to step S625.

In step S625, the system control unit 50 determines whether the operation of moving the AF frame is performed. For example, by moving the AF frame using the directional pad 108 of the operation unit 227, or by directly touching the position to which the user wants to move the AF frame, using the touch panel 227a, the user performs the operation of moving the AF frame. If the operation of moving the AF frame is performed (Yes in step S625), the processing proceeds to step S626. If the operation is not performed (No in step S625), the processing proceeds to step S632.

In step S626, according to the operation of moving the AF frame, the system control unit 50 moves the AF frame. According to the movement of the AF frame, the system control unit 50 sequentially stores the position information of the indicator of the AF frame in the system memory 223.

In step S627, based on the information stored in the system memory 223, the system control unit 50 determines whether the touch button is placed in an upper portion of the screen. If the touch button is placed in the upper portion of the screen (Yes in step S627), the processing proceeds to step S628. If the touch button is not placed in the upper portion (No in step S627), the processing proceeds to step S630.

In step S628, the system control unit 50 determines whether the position information of the AF frame is smaller than the threshold Th2. Specifically, the system control unit 50 makes the determination based on the position information of the indicator of the AF frame and the threshold Th2 stored in the non-volatile memory 222 in advance. If the position information of the AF frame is smaller than the threshold Th2, i.e., if the position of the AF frame is located above the threshold Th2, which is at the center position in the Y-axis direction of the display unit 105 (Yes in step S628), the processing proceeds to step S629. If the position information of the AF frame is greater than the threshold Th2 (No in step S628), the system control unit 50 does not move the touch button, and the processing returns to step S624.

In step S629, the system control unit 50 places the touch button in a lower portion of the screen and stores, in the system memory 223, information indicating that the position of the touch button is in the lower portion.

In step S630, the system control unit 50 determines whether the position information of the AF frame is greater than the threshold Th1. Specifically, the system control unit 50 makes the determination based on the position information of the indicator of the AF frame and the threshold Th1 stored in the non-volatile memory 222 in advance. If the position information of the AF frame is greater than the threshold Th1, i.e., if the position of the AF frame is located below the threshold Th1, which is at a position on the lower side of the display unit 105 (Yes in step S630), the processing proceeds to step S631. If the position information of the AF frame is not greater than the threshold Th1 (No in step S630), the system control unit 50 does not move the touch button, and the processing returns to step S624.

In step S631, the system control unit 50 places the touch button in the upper portion of the screen and stores, in the system memory 223, information indicating that the position of the touch button is in the upper portion.

In steps S627 to S631, similar to steps S612 to S616, the rate at which the touch button is displayed on the lower side is greater.

In step S632, the system control unit 50 determines whether the operation of resetting the AF frame is performed. For example, by touching a reset button 408 illustrated in FIG. 7B, the user can perform the operation of resetting the AF frame. If the operation of resetting the AF frame is performed (Yes in step S632), the processing proceeds to step S633. If the operation is not performed (No in step S632), the processing returns to step S624.

In step S633, the system control unit 50 resets the AF frame and returns the AF frame to the center position, which is the initial position. Then, the processing proceeds to step S627.

In step S634, the system control unit 50 ends the AF frame setting screen and displays the image capturing standby screen in the diorama image capturing mode. In step S634, similar to step S602, the screen as illustrated in FIG. 4A is displayed. Further, in step S634, according to the operation of finalizing the AF frame in step S624, the system control unit 50 stores the position information of the indicator of the diorama frame, the information indicating whether the diorama frame is vertical or horizontal, and the position information of the indicator of the AF frame in the non-volatile memory 222. In step S635, the system control unit 50 determines whether an image capturing preparation instruction is given. The image capturing preparation instruction is given by the user half-pressing the shutter button 101 and the first shutter switch 225 being turned on. If the image capturing preparation instruction is given (Yes in step S635), the processing proceeds to step S636. If the image capturing preparation instruction is not given (No in step S635), the processing returns to step S601.

In step S636, the system control unit 50 starts an AF process based on the position of the set AF frame.

In step S637, the system control unit 50 determines whether an image capturing instruction is given. The image capturing instruction is given by the user full-pressing the shutter button 101 and the second shutter switch 226 being turned on. If the image capturing instruction is given (Yes in step S637), the processing proceeds to step S638. If the image capturing instruction is not given (No in step S637), the processing returns to step S635.

In step S638, the system control unit 50 starts an image capturing process.

In step S639, the system control unit 50 performs a recording process for recording image data in the storage medium 240. In a case where the diorama frame is set, the system control unit 50 applies the blurring effect according to the position of the set diorama frame.

If the normal mode is set in step S601 (No in step S601), the processing proceeds to step S640.

In step S640, the system control unit 50 displays an image capturing standby screen in the normal mode. Further, the system control unit 50 displays an AF frame in a superimposed manner on a live view image. Specifically, the system control unit 50 reads position information of an indicator of the AF frame from the non-volatile memory 222 and displays the AF frame based on the read information. The non-volatile memory 222 stores information of an initial position of the AF frame in advance. However, in a case where the user has set the AF frame, the non-volatile memory 222 stores the position information of the indicator of the AF frame that is previously set. For example, the system control unit 50 displays the image capturing standby screen 300a in the normal mode illustrated in FIG. 3A.

In step S641, the system control unit 50 determines whether an AF frame setting is to be started. For example, by touching the AF frame setting shifting button 302 illustrated in FIG. 3A, the user gives an instruction to start the AF frame setting. If the AF frame setting is to be started (Yes in step S641), the processing proceeds to step S642. If the AF frame setting is not to be started (No in step S641), the processing proceeds to step S635.

In step S642, the system control unit 50 displays an AF frame setting screen. For example, the system control unit 50 displays the AF frame setting screen 300b (except for the touch buttons) illustrated in FIG. 3B.

In step S643, the system control unit 50 determines whether the position information of the AF frame is greater than the threshold Th1. This determination is a process for determining the placement of a touch button. Specifically, the system control unit 50 makes the determination based on the position information of the indicator of the AF frame and the threshold Th1 stored in the non-volatile memory 222 in advance. If the position of the AF frame is greater than the threshold Th1 (Yes in step S643), the processing proceeds to step S645. If the position information of the AF frame is not greater than the threshold Th1 (No in step S643), the processing proceeds to step S644.

In step S644, the system control unit 50 places the touch button in a lower portion of the screen. Further, the system control unit 50 stores, in the system memory 223, information indicating that the position of the touch button is in the lower portion. For example, the system control unit 50 places the finalize button 303 in the lower portion of the screen as illustrated in FIG. 5D. Then, the processing proceeds to step S624.

In step S645, the system control unit 50 places the touch button in an upper portion of the screen. Further, the system control unit 50 stores, in the system memory 223, information indicating that the position of the touch button is in the upper portion. For example, the system control unit 50 places the finalize button 303 in the upper portion of the screen as illustrated in FIG. 5E. Then, the processing proceeds to step S624.

Thus, on the AF frame setting screen in the normal mode, immediately after transition to the AF frame setting screen, the touch button is displayed so as not to overlap the AF frame according to the position of the AF frame. As described above, on the AF frame setting screen in the diorama image capturing mode, immediately after transition to the AF frame setting screen, the touch button is displayed at a same position as immediately before the transition to the AF frame setting screen, regardless of the position of the AF frame.

As described above, according to the present exemplary embodiment, when a setting screen where the display position of an item such as a diorama frame is to be moved transitions to a setting screen where the display position of an item such as an AF frame is to be moved, a touch button remains displayed in the same area. This improves the operability for the user. Further, on a screen where the display position of an item is to be moved to a position corresponding to a touch position according to a touch operation, the display position of a function button for executing a predetermined function according to a touch on the function button is changed according to the display position of the item. This improves operability. When the function button is touched, the screen transitions to a next screen where the display position of an item is to be moved to a position corresponding to a touch position according to a touch operation. Further, on the next screen, the display position of a function button for executing a predetermined function does not change. Accordingly, the user can quickly make settings by touching the same position twice. Also on the next screen, if the display position of the item is changed, the display position of the function button also changes. Thus, the operability does not decrease even in a case where the display position of the item is changed on the next screen.

In the above exemplary embodiment, a case has been described where a touch button on a setting screen for the display position of an item is displayed at the same position as the display position of a touch button on a setting screen for the display position of another item displayed immediately before transition. The present disclosure, however, is not limited to this case. Alternatively, a touch item may be displayed at a position close to the display position of another item displayed immediately before transition as long as the touch item can be quickly touched at the close position. The "close position" refers to the position where an area where a touch button on a setting screen for the display position of another item immediately before transition to a setting screen for the display position of a current item is displayed overlaps an area where a current touch button is displayed by half or more, preferably 90% or more.

Further, in the above exemplary embodiment, a case has been described where the rate at which the touch button is displayed on the lower side is greater. This is, however, merely an example, and the rate at which the touch button is displayed on the upper side may be greater. A threshold for displaying the touch button may be set such that the rate at which the touch button is displayed at either position is greater according to the display position of a touch button on another screen.

In the present exemplary embodiment, a case has been described where, if the diorama frame is horizontal, the touch button is displayed with the position of the touch button being changed according to the position of the diorama frame, and if the diorama frame is vertical, the touch button is displayed at a predetermined position, regardless of the position of the diorama frame. The present disclosure, however, is not limited to this case. For example, if the diorama frame is in either one of the vertical and horizontal orientations, the touch button may be displayed with the position of the touch button being changed according to the position of the diorama frame. Further, if the diorama frame is in the other of the vertical and horizontal orientations, the touch button may be displayed at a predetermined position, regardless of the position of the diorama frame. Further, the shape of the display unit 105 may be a rectangle long in the vertical direction, or may be a rectangle having approximately the same lengths in the horizontal and vertical directions.

In a second exemplary embodiment, an example is described where the present disclosure is applied to a screen for performing an image editing process. Description will now be given on a case where a brightness setting and a filter effect setting can be made in order to edit a displayed image. The second exemplary embodiment is an example of a smartphone. Similar to the first exemplary embodiment, a smartphone 200 includes a display unit 105, a system control unit 50, a touch panel 227a, a system memory 223, and a non-volatile memory 222.

Figure 8A:
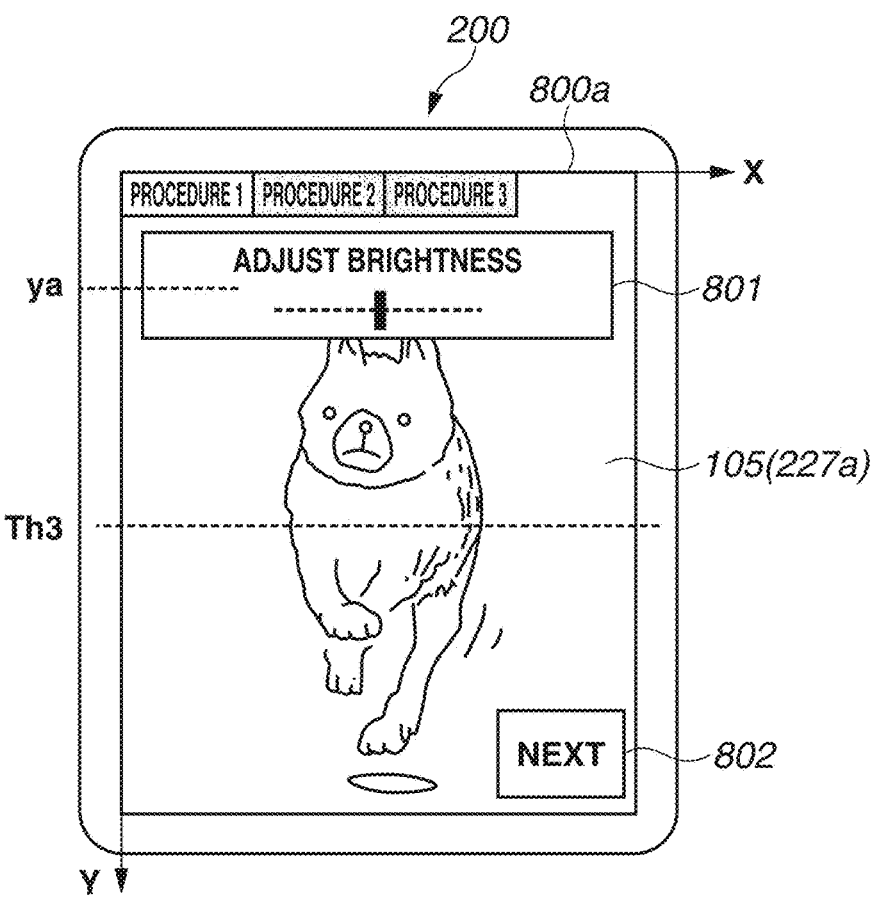
FIGS. 8A, 8B, 8C, 8D, and 8E are diagrams illustrating examples of setting screens according to a second exemplary embodiment.

FIG. 8A is a diagram illustrating an example of a brightness setting screen 800a. On the brightness setting screen 800a, a brightness adjustment item 801 and a shifting button 802 are displayed. The position of the brightness adjustment item 801 can be changed by a touch of the user, and the brightness adjustment item 801 is displayed at a coordinate ya in a Y-axis direction in FIG. 8A. The shifting button 802 is a touch button. The brightness adjustment item 801 is displayed at a coordinate smaller than (above) a threshold Th3, which is the center in the Y-axis direction of the display unit 105. Thus, the shifting button 802 is placed on the lower side of the screen. Accordingly, it is possible to improve the operability on the shifting button 802 and improve the visibility of the shifting button 802. This processing corresponds to steps S606, S607, S614, and S616 in FIGS. 6A and 6B.

In this case, if the user moves the position of the brightness adjustment item 801 to a position having position information greater than the threshold Th3, i.e., an area on the lower side of the screen, the shifting button 802 is displayed with the position of the shifting button 802 being changed to the upper side of the screen. By the user moving the position of the brightness adjustment item 801, the position of an image desired by the user can be prevented from overlapping the item.

To finalize the brightness of the image, the user touches the shifting button 802, whereby the brightness setting screen 800a shifts to a filter effect setting.

Figure 8B:
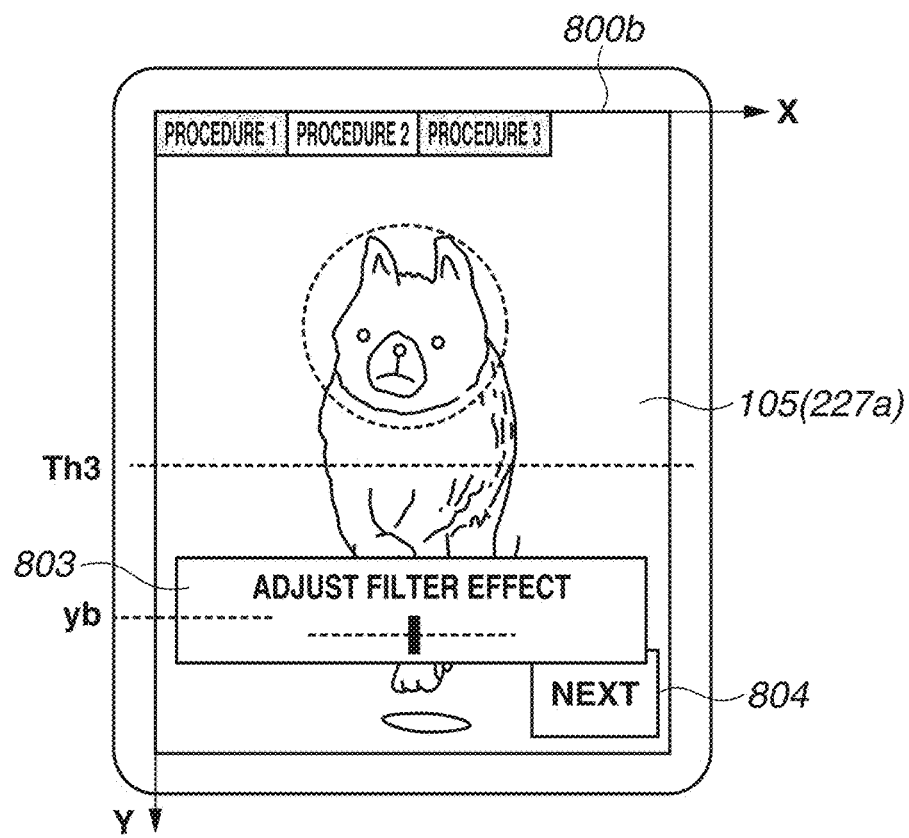

FIG. 8B is a diagram illustrating an example of a filter effect setting screen 800b.

The filter effect setting screen 800b is a screen displayed immediately after the brightness setting screen 800a transitions according to the operation of finalizing the brightness on the brightness setting screen 800a illustrated in FIG. 8A. On the filter effect setting screen 800b, a filter effect adjustment item 803 and a shifting button 804 are displayed. The position of the filter effect adjustment item 803 can be changed by a touch of the user, and the filter effect adjustment item 803 is displayed at a coordinate yb in the Y-axis direction in FIG. 8B. The shifting button 804 is a touch button. In this case, the filter effect adjustment item 803 is displayed at a coordinate greater than the threshold Th3, but the shifting button 804 is placed on the lower side. Specifically, the shifting button 802 on the brightness setting screen 800a in FIG. 8A and the shifting button 804 on the filter effect setting screen 800b are displayed at the same position. This processing corresponds to step S623 in FIG. 6C. Thus, to immediately finalize the filter effect without needing to change the position of the filter effect, the user can instantaneously touch the shifting button 804.

Figure 8C:
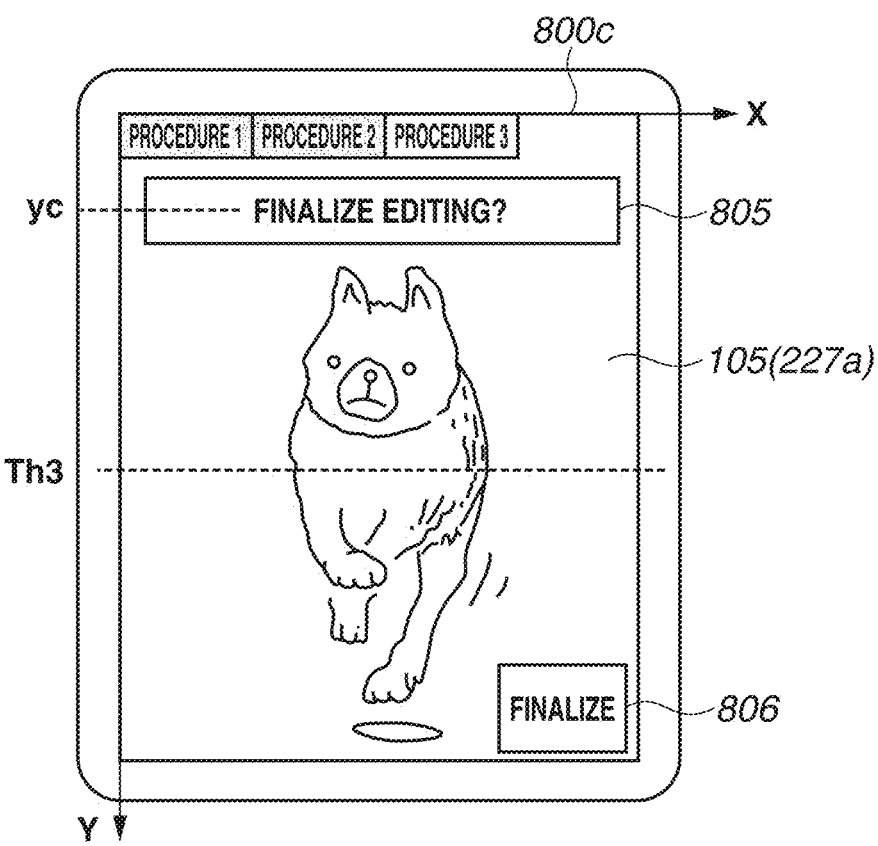

FIG. 8C is a diagram illustrating an example of a finalization confirmation screen 800c.

The finalization confirmation screen 800c is a screen displayed immediately after the shifting button 804 is touched without changing the position of the filter effect adjustment item 803 from the filter effect setting screen 800b illustrated in FIG. 8B. On the finalization confirmation screen 800c, a message item 805 and a finalize button 806 are displayed. The position of the message item 805 can be changed by a touch of the user, and the message item 805 is displayed at a coordinate yc in the Y-axis direction in FIG. 8C. The finalize button 806 is a touch button. In this case, the shifting button 804 on the filter effect setting screen 800b in FIG. 8B and the finalize button 806 on the finalization confirmation screen 800c are displayed at the same position. Thus, to immediately finalize the editing of the image, the user can instantaneously touch the finalize button 806. If the user moves the position of the message item 805 from the state of FIG. 8C to a position having position information greater than the threshold Th3, i.e., an area on the lower side of the screen, the finalize button 806 is displayed with the position of the finalize button 806 being changed to the upper side of the screen.

Figure 8D:
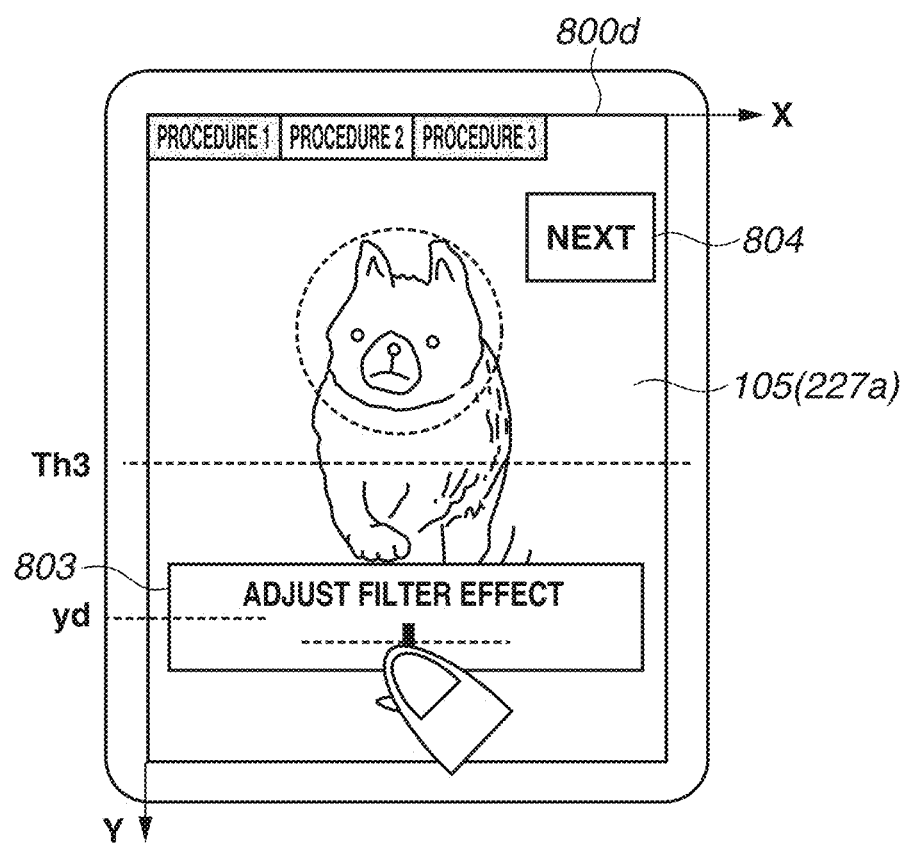

FIG. 8D is a diagram illustrating an example of a filter effect setting screen 800d.

The filter effect setting screen 800d is a screen displayed according to the operation of changing the position of the filter effect adjustment item 803 on the filter effect setting screen 800b illustrated in FIG. 8B. On the filter effect setting screen 800d, a filter effect adjustment item 803 and a shifting button 804 are displayed. The filter effect adjustment item 803 and the shifting button 804 are designated by the same signs as those in FIG. 8B. In this case, according to the operation of changing the position of the filter effect adjustment item 803 by the user, the shifting button 804 is displayed with the position of the shifting button 804 being changed. In FIG. 8D, the filter effect adjustment item 803 is moved to a coordinate yd in the Y-axis direction greater than (below) the threshold Th3, which is the center in the Y-axis direction of the display unit 105. Thus, the shifting button 804 is placed on the upper side of the screen. Accordingly, it is possible to improve the operability on the shifting button 804 and improve the visibility of the shifting button 804. This processing corresponds to steps S629 and S631 in FIG. 6C.

Figure 8E:
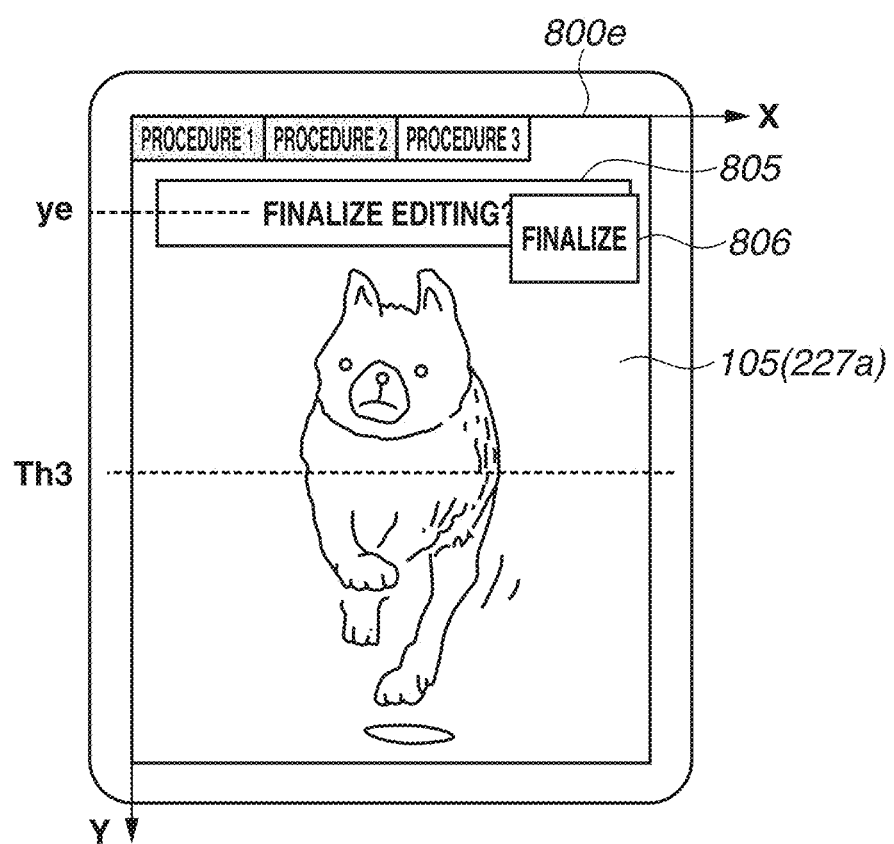

FIG. 8E is a diagram illustrating an example of a finalization confirmation screen 800e.

The finalization confirmation screen 800e is a screen displayed immediately after the shifting button 804 is touched after the filter effect is adjusted on the filter effect setting screen 800d illustrated in FIG. 8D or after the position of the filter effect adjustment item 803 is changed. On the finalization confirmation screen 800e, a message item 805 and a finalize button 806 are displayed. The message item 805 and the finalize button 806 are designated by the same signs as those in FIG. 8C. In this case, the message item 805 is displayed at a coordinate ye in the Y-axis direction smaller than (above) the threshold Th3, but the finalize button 806 is placed on the upper side. Specifically, the shifting button 804 on the filter effect setting screen 800d in FIG. 8D and the finalize button 806 on the finalization confirmation screen 800e are displayed at the same position. This processing corresponds to step S623 in FIG. 6C. Thus, to immediately finalize the editing of the image, the user can instantaneously touch the finalize button 806.

As described above, according to the present exemplary embodiment, on a brightness setting screen where the position of a brightness adjustment item can be changed, a shifting button is displayed with the position of the shifting button being changed according to the position of the brightness adjustment item. Further, in a case where the brightness setting screen transitions to a filter effect setting screen, a shifting button is displayed, regardless of the position of a filter effect adjustment item.

Further, in the above exemplary embodiments, a description has been given of a method for, according to a touch operation on a touch panel, displaying a diorama frame or an AF frame at a position where the touch operation is performed. The above exemplary embodiments, however, are applicable not only to this method but also to a method in which coordinates are input as follows. That is, the above exemplary embodiments are also applicable to a case where an instruction to input coordinates (a position) is given not only by a touch operation but also by a pointer or a gesture. Also in this case, if the positions where coordinates are input are close to each other, an instruction to change the position of a frame and an instruction to select a finalize button cannot be distinguished. Thus, operability is improved if the display position of the item such as the finalize button is varied according to the position of the frame. Further, also in a case where a setting screen for a diorama frame transitions to a setting screen for an AF frame, if items such as finalize buttons are displayed at the same position on the screens, the positions where coordinates are input do not need to be changed. This improves the operability for the user.

Further, in the above exemplary embodiments, a case has been described where the display positions of finalize buttons (items) do not change when a diorama frame setting screen switches to an AF frame setting screen. These items, however, may not need to be the same buttons. For example, a finalize button for finalizing the state where the first character is input in image editing is displayed at a first position, and according to a touch on the finalize button, this screen transitions to a screen allowing the selection of whether to input another character or apply a stamp or an image effect. On the screen after the transition, a button for ending all the editing is displayed at the position (or in the same area) where the finalize button was displayed, thereby improving the operability in a case where the user wants to immediately end the editing. Alternatively, in the case of the process of inputting a stamp after inputting a character, a button for displaying a screen for selecting a stamp may be displayed at the position where the finalize button was displayed. A button for performing a next process is thus displayed at the same position or in the same area, whereby it is possible to improve the operability for the user. It goes without saying that even in the above case, as the position of a character input or the position of a stamp is changed, the display position of the finalize button or the button for displaying the screen for selecting a stamp is changed.

Further, in the above exemplary embodiments, the units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

As described above, while the present disclosure has been described based on exemplary embodiments, the present disclosure is not limited to these specific exemplary embodiments. The present disclosure also includes various forms without departing from the spirit and scope of the disclosure. Further, the above exemplary embodiments merely illustrate exemplary embodiments of the present disclosure, and can also be appropriately combined with each other.

A description has been given on cases where the system control unit 50 controls the above various types of control. Alternatively, a single piece of hardware may control the above various types of control. Yet alternatively, a plurality of pieces of hardware may share processing to control the entire apparatus.

Further, in the above exemplary embodiments, cases have been described where the present disclosure is applied to the camera 100 and the smartphone 200. The present disclosure, however, is not limited to these cases, and is applicable to any electronic device that displays, according to the position of an item, a predetermined item different from the item by changing the position of the predetermined item. In other words, the present disclosure is applicable to a personal computer, a personal digital assistant (PDA), a mobile phone terminal, a mobile image viewer, and a printer apparatus including a display. Further, the present disclosure is applicable to a digital photo frame, a music player, a game apparatus, an electronic book reader, a tablet terminal, a smartphone, a projection apparatus, a household electrical appliance apparatus including a display, and an in-vehicle apparatus including a display.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-246877, filed Dec. 22, 2017, which is hereby incorporated by reference herein in its entirety.

What is claimed is:

1. An electronic device comprising:
    a detection unit configured to detect an operation on a display screen;
    a display control unit configured to perform control to display a first display item and a predetermined item on the display screen; and
    a control unit configured to perform control in such a manner that, according to an operation on the display screen in a first state, the first state transitions to a second state for changing a display position of the first display item,
    wherein the display control unit performs control in such a manner that, in a case where the first state transitions to the second state, the predetermined item is displayed regardless of the display position of the first display item, and in a case where an operation for changing the display position of the first display item is performed in the second state, the predetermined item is displayed at a position corresponding to the changed display position of the first display item.

2. The electronic device according to claim 1, wherein the display control unit performs control in such a manner that, in a case where the first state transitions to the second state, the predetermined item is displayed at a position where the predetermined item was displayed before the first state transitions to the second state regardless of the display position of the first display item.

3. The electronic device according to claim 1, wherein the display control unit performs control in such a manner that when the first display item is displayed in a lower portion of the display screen and in a case where the display position of the first display item is changed to a first area in the lower portion of the display screen, the display position of the predetermined item is changed so that the predetermined item is displayed in an upper portion of the display screen, and when the first display item is displayed in the upper portion of the display screen and in a case where the display position of the first display item is changed to a second area in the upper portion of the display screen, the display position of the predetermined item is changed so that the predetermined item is displayed in the lower portion of the display screen.

4. The electronic device according to claim 1,
    wherein the control unit performs control in such a manner that, in response to detection of an operation on the predetermined item in the first state, the first state transitions to the second state, and
    wherein the display control unit performs control in such a manner that, in a case where the first state transitions to the second state, the display position of the predetermined item is not changed.

5. The electronic device according to claim 1, wherein the control unit performs control in such a manner that, in response to detection of an operation on the predetermined item in the second state, the second state is ended.

6. The electronic device according to claim 1, wherein the control unit performs control in such a manner that, in response to detection of an operation on the predetermined item in the first state, the first state transitions to the second state, and in response to detection of an operation on the predetermined item in the second state, the second state is ended.

7. The electronic device according to claim 1,
    wherein the display control unit performs control to display the first display item in the first state, and wherein the display control unit performs control in such a manner that, in the first state, the display position of the first display item is not changed according to an operation on the display screen.

8. The electronic device according to claim 1, wherein, according to an operation on the display screen, the display position of the first display item can be changed to the position where the predetermined item is displayed.

9. The electronic device according to claim 1,
wherein the display control unit performs control to display the first display item together with a live image captured by an image capturing unit, and
wherein the first display item is an autofocus (AF) frame indicating an AF position.

10. The electronic device according to claim 1, wherein the detection unit is a touch panel that detects a touch operation on the display screen.

11. The electronic device according to claim 1,
wherein in the first state, a second display item is displayed on the display screen, and a display position of the second display item can be changed according to an operation on the display screen, and
wherein the display control unit performs control in such a manner that, in a case where the state of the display screen transitions to the first state, the predetermined item is displayed at a position corresponding to the display position of the second display item.

12. The electronic device according to claim 11, wherein the display control unit performs control in such a manner that, in a case where the display position of the second display item is changed in a first direction in the first state, the display position of the predetermined item is changed according to the display position of the second display item, and in a case where the display position of the second display item is changed in a second direction orthogonal to the first direction, the display position of the predetermined item is not changed according to the display position of the second display item.

13. The electronic device according to claim 11, wherein the second display item is a frame for specifying an area to which a blurring effect is applied.

14. The electronic device according to claim 13, further comprising a diorama processing unit configured to apply a blurring effect outside an area specified using the second display item in an image captured by an image capturing unit.

15. The electronic device according to claim 11, wherein, in the first state, according to an operation on the display screen, the display position of the second display item can be changed to the position where the predetermined item is displayed.

16. A control method for controlling an electronic device including a detection unit configured to detect an operation on a display screen, the control method comprising:
performing control to display a first display item and a predetermined item on the display screen;
performing control in such a manner that, in response to detection of an operation on the display screen in a first state, the first state transitions to a second state for changing a display position of the first display item;
performing control in such a manner that, in a case where the first state transitions to the second state, the predetermined item is displayed regardless of the display position of the first display item; and
performing control in such a manner that, in a case where an operation for changing the display position of the first display item is performed in the second state, the predetermined item is displayed at a position corresponding to the changed display position of the first display item.

17. A non-transitory computer-readable storage medium for causing a computer to execute a control method for controlling an electronic device including a detection unit configured to detect an operation on a display screen, the control method comprising:
performing control to display a first display item and a predetermined item on the display screen;
performing control in such a manner that, in response to detection of an operation on the display screen in a first state, the first state transitions to a second state for changing a display position of the first display item;
performing control in such a manner that, in a case where the first state transitions to the second state, the predetermined item is displayed regardless of the display position of the first display item; and
performing control in such a manner that, in a case where an operation for changing the display position of the first display item is performed in the second state, the predetermined item is displayed at a position corresponding to the changed display position of the first display item.

* * * * *